(12) United States Patent
Kohvakka et al.

(10) Patent No.: US 7,830,838 B2
(45) Date of Patent: Nov. 9, 2010

(54) ENERGY EFFICIENT WIRELESS SENSOR NETWORK, NODE DEVICES FOR THE SAME AND A METHOD FOR ARRANGING COMMUNICATIONS IN A WIRELESS SENSOR NETWORK

(75) Inventors: Mikko Kohvakka, Tampere (FI); Timo D. Hämäläinen, Kangasala (FI); Marko Hännikäinen, Pirkkala (FI)

(73) Assignee: Wirepas Oy (FI)

( * ) Notice: Subject to any disclaimer, the term of this patent is extended or adjusted under 35 U.S.C. 154(b) by 655 days.

(21) Appl. No.: 11/793,840

(22) PCT Filed: Dec. 21, 2005

(86) PCT No.: PCT/FI2005/000543
§ 371 (c)(1),
(2), (4) Date: Nov. 23, 2007

(87) PCT Pub. No.: WO2006/067271
PCT Pub. Date: Jun. 29, 2006

(65) Prior Publication Data
US 2008/0253327 A1 Oct. 16, 2008

(30) Foreign Application Priority Data
Dec. 22, 2004 (FI) .................................. 20041653

(51) Int. Cl.
*H04L 12/28* (2006.01)
(52) U.S. Cl. ...................................................... 370/330
(58) Field of Classification Search .................. 370/330
See application file for complete search history.

(56) References Cited

U.S. PATENT DOCUMENTS

| 5,883,884 A | * | 3/1999 | Atkinson | 370/279 |
| 6,226,601 B1 | * | 5/2001 | Longaker | 702/79 |
| 6,512,462 B1 | * | 1/2003 | Robineau | 340/825.72 |
| 2002/0018451 A1 | * | 2/2002 | Sharony | 370/329 |

(Continued)

FOREIGN PATENT DOCUMENTS

WO    WO 0155865 A1 *   8/2001

OTHER PUBLICATIONS

"Bluetooth—The Universal Radio Interface for Ad Hoc, Wireless Connectivity", Jaap Harsten, Ericsson Review No. 3, 1998.

*Primary Examiner*—Melvin Marcelo
(74) *Attorney, Agent, or Firm*—Wood, Phillips, Katz, Clark & Mortimer

(57) ABSTRACT

A wireless sensor network, a node device thereof and a method for arranging communications therein are presented. A first frequency is used in wireless communication of information between a headnode and subnodes of a first cluster (103) using a time slotted channel access scheme. A headnode of a second cluster (113) known the first frequency and selects a second, different frequency for use in wireless communication of information within said second cluster (113) using a time slotted channel access scheme. The headnode of the first cluster (103) is informed about the second frequency selected for the second cluster (113). Information from the headnode of said first cluster (103) to the headnode of said second cluster (113) is communicated on said second frequency, using the same time slotted channel access scheme as other nodes in said second cluster (113).

49 Claims, 8 Drawing Sheets

U.S. PATENT DOCUMENTS

2002/0071395 A1* 6/2002 Redi et al. .................. 370/252
2004/0042434 A1* 3/2004 Kennedy .................... 370/338
2010/0110930 A1* 5/2010 Kohvakka et al. ........... 370/254

* cited by examiner

ENERGY EFFICIENT WIRELESS SENSOR NETWORK, NODE DEVICES FOR THE SAME AND A METHOD FOR ARRANGING COMMUNICATIONS IN A WIRELESS SENSOR NETWORK

TECHNICAL FIELD

The invention concerns generally the technology of wireless sensor networks. Especially the invention concerns optimizing the overall power consumption of a wireless sensor network, primarily through means of finding communications protocols and arrangements that strike an effective balance between required information throughput and energy consumed for transmitting and receiving information.

BACKGROUND OF THE INVENTION

A wireless sensor network (WSN) is a special case of wireless networks, the specific characteristics thereof including generally very strict requirements for minimizing the physical size and power consumption of node devices, as well as specialized roles for the nodes: a large majority of the nodes are sensors that collect information and convey it to certain data sink nodes, which are few in number and may act as gateways that pass the collected information to other networks and systems. Wireless sensor networks have frequently an ad-hoc nature, which means that nodes may come and go or roam from one part of the network to another, and the network must adapt itself to the consequent changes in topology and connectivity, often necessitating multi-hop routing capability. Throughput rates in sensor networks are usually relatively low, at least compared with the Mbit/s level data rates of communications networks between computers. For the sake of generality also actuators may be considered as nodes; it is conventional to understand the word "sensor" in wireless sensor networks widely to encompass both true sensors and actuators.

Wireless sensor networks and their nodes are known in general from numerous prior art publications. A publication US 2004/0100917 A1 discloses a coordinator device election process, the purpose of which is to ensure that no part of an ad-hoc wireless sensor network becomes disconnected, as well as to minimize the overall amount of energy needed for setting up arranged communications through the network. The solution disclosed therein is based on distributing an initialization message through the network, after which each node applies a random delay before broadcasting a "request for coordinator status" message. Another publication US 2003/0152041 A1 describes certain general level features of wireless sensor networks, including hierarchical allocation of nodes to a plurality of node levels as well as keeping a node dormant at all other times than initializing the node or making it perform a task.

A prior art publication US 2002/0044533 A1 mentions the drawbacks of depending on the accurately known spatial position of each node, which conventionally required each node to comprise a GPS (Global Positioning System) receiver. As a more advantageous alternative said publication presents a system in which each node finds out the full set of other nodes it could basically communicate with, but only maintains active communications with a subset thereof, which leads to a position independent way of setting up and maintaining network topology. Another prior art publication CA 2 311 245 A1 considers the division of nodes into two hierarchical levels, so that each higher-level node governs a cluster of neighboring lower-level nodes, and higher power "trunk line" communications are only needed between the higher-level nodes.

A prior art publication WO 01/69279 discloses a wireless sensor network in which each node has its own locating device, and the nodes are capable of exchanging both location information and reconnaissance data. The system is mainly meant for military reconnaissance purposes. Another prior art publication WO 01/26329, which is a member of a very large family of interrelated patent applications, discloses a very large number of details that at the time of writing this description are already considered to form the generally known state of the art of wireless sensor networks. Yet another prior art publication is U.S. Pat. No. 6,208,247 B1, which focuses mainly on the physical implementation of node devices for wireless sensor networks.

The main source of difficulties on the route towards minimized power consumption in wireless sensor networks is traditionally the communications protocol that determines the amount and nature of wireless transmissions between the nodes. The fact that the network must be able to dynamically adapt to appearance and disappearance of nodes as well as other changes in network topology means that the communications protocol must include sufficient procedures for discovering currently available possibilities of communicating with other nodes, as well as routines for determining the order in which the currently connected nodes communicate with each other. The communications protocol should involve a certain degree of scalability, which means that it should facilitate energy efficient communications regardless of how many nodes there are in the network. Additionally the communications protocol should ensure some required minimum level of throughput, i.e. amount of information that can be transmitted to a desired destination through the network in some unit of time. The most important part of the communications protocol is believed to be the MAC part (Medium Access Control).

Known protocols for wireless sensor networks include the Sensor-MAC (also known as S-MAC), the Timeout-MAC (T-MAC) and the IEEE 802.15.4 Low Rate Wireless Personal Area Network (LR-WPAN) standard. Of these, the S-MAC has been described in the scientific publication W. Ye, J. Heidemann, and D. Estrin: "Medium access control with coordinated, adaptive sleeping for wireless sensor networks," ACM/IEEE Trans. Networking, vol. 12, no. 3, pp. 493-506, June 2004. It utilizes a common slot structure within a Carrier Sense Multiple Access (CSMA) MAC scheme. Nodes are scheduled to be periodically awake and sleep, which reduces significantly energy consumption compared to conventional CSMA. An S-MAC slot consists of a short beacon type synchronization transmission, a fixed length (300 ms) active period for data exchange, and a sleep time until the end of the slot. Each node wakes up at the beginning of a slot and any node wishing to transmit data performs CSMA/CA channel access with an RTS/CTS (Request To Send/Clear To Send) handshake. The slot length is a predefined and static MAC parameter in the order of 500 ms to 10 s. In the newest implementation, S-MAC protocol performs 10 s long network scanning every 2 minutes. Clearly, network scanning consumes a high amount of energy.

The Timeout-MAC (T-MAC) is described in the scientific publication XXX. The protocol is similar to S-MAC, but energy efficiency is improved by adjusting dynamically the length of the active period. A node goes to sleep mode if it cannot receive any activity on the channel within a 15 ms time-out interval. In contrast to S-MAC, slot length is fixed to 610 ms. T-MAC performs sporadically 610 ms long network scanning. This short scanning time keeps energy consumption quite low.

The IEEE 802.15.4 LR-WPAN standard is a member of the IEEE 802.15.X family of WPAN standards and has been described in "Wireless Medium Access Control (MAC) and Physical Layer (PHY) Specifications for Low-Rate Wireless Personal Area Networks (LR-WPANS)", IEEE Std 802.15.4-2003 edition. It utilizes CSMA/CA channel access with optional use of superframe structure, which is quite similar to S-MAC slot structure. A LR-WPAN network consists of coordinators, which provide synchronization services and route data in a network, and devices, which may only communicate with coordinators. Coordinators control their superframe structures by transmitting beacons at the beginning of each superframe. A beacon is followed by a Contention Access Period (CAP), during which network nodes can transmit data and requests to a coordinator using CSMA/CA. Optional dedicated assignment type Guaranteed Time Slots (GTS) after CAP reduce contention and latency. The CAP and GTS are optionally followed by an inactive period until a next beacon during which nodes may go to sleep mode. Beacon period and superframe length are variable between 15.4 ms to 252 s, which enables a trade-off between latency and energy consumption. LR-WPAN nodes perform network scanning periodically over a set of RF channels. Each channel is received for a beacon interval or until a specified number of beacons has been received. The worst case scanning time is over 67 minutes, when the maximum beacon interval and all 16 channels specified for the 2.4 GHz frequency band are scanned. This equals the energy of several million beacon transmissions. Clearly, the consumed energy for network scanning may be very high.

A further development to the above described LR-WPAN is known as the ZigBee and described online on the official website of the ZigBee alliance (http://www.zigbee.org). It includes network and security layer definitions and application profiles, and supports access control lists, packet freshness timers and certain encryption standards.

Another protocol suggestion is the Self-Organizing Medium Access Control for Sensor Networks (SMACS), described in the scientific publication K. Sohrabi, J. Gao, V. Ailawadhi, and G. J. Pottie: "Protocols for self-organization of a wireless sensor network," IEEE Personal Communications, vol. 7, no. 5, pp. 16-27, October 2000. It enables nodes to discover their neighbours, form links, and establish schedules for transmission and reception without the need of master nodes. A network uses peer-to-peer topology with Frequency Division Multiple Access (FDMA), where each link operates at different RF channels. SMACS protocol is based on stationary wireless nodes. However, the protocol has an extension for mobility management by an Eavesdrop-And-Register (EAR) algorithm, which enables interconnection of mobile nodes in the field of stationary wireless nodes. SMACS enables quite high energy efficiency due to scheduled data exchange slots. The disadvantages are high performance requirements for each network node and the support for only limited mobility.

Linked Cluster Architecture (LCA) is a solution that has been known already for over twenty years. It was first described in the scientific publication D. Baker, and A. Ephremides: "The architectural organization of a mobile radio network via a distributed algorithm," IEEE Trans. Communications, vol. 29 no. 11, pp. 1694-1701, November 1981. It improves scalability by organizing the network into a set of clusters, each having a cluster head, which acts as a local controller. Other nodes are either ordinary nodes, or gateway nodes, which both are in direct communication range with the cluster head. LCA utilizes Time Division Multiple Access (TDMA) MAC with dedicated time slots for each node. The regular data transfer is suspended periodically by a control phase to perform a distributed clustering algorithm, during which neighboring nodes are detected and logical node function chosen. In LCA, nodes record and maintain information about their immediate environment, which makes the protocol quite well scalable. The disadvantage is that LCA utilizes a global TDMA frame structure, which requires a global clock. Additionally since the nodes are only aware of their neighboring clusters, multi-hop routing is not supported.

Yet another known protocol is the Low-Energy Adaptive Clustering Hierarchy (LEACH) described in the scientific publication W. Heinzelman, A. Chandrakasan, and H. Balakrishnan: "An application-specific protocol architecture for wireless microsensor networks," IEEE Trans. Wireless Communications, vol. 1, no. 4, pp. 660-670, October 2002. It is a dedicated assignment MAC protocol with clustered topology. LEACH extends the network hierarchy by a base station, which acts like a root in a network. Cluster heads and the base station employ only direct communications. Thus, a star topology is utilized in two hierarchical levels. LEACH protocol improves total network energy efficiency by allowing most nodes to transmit short distances, and requiring only cluster heads to use high transmission power for communicating with a base station. Consequently, the cluster heads have a shorter battery life than other nodes, which may reduce the overall network lifetime. To distribute energy consumption more evenly, LEACH proposes to rotate cluster heads randomly. A drawback is that the network scalability is limited by the coverage and the performance of the base station.

All known protocol suggestions include drawbacks that make the unsuitable for use as the communications protocol for the ultimate low-power wireless sensor network. Many of them simply require too many transmissions to qualify as truly low-power solutions. In others, the time a node typically needs for network scanning is prohibitively long. One specific problem that arise in many otherwise advanced protocols is that they require using rather complex hardware at each node, for example for repetitively measuring and storing multiple RSSI (Received Signal Strength Indicator) values.

SUMMARY OF THE INVENTION

An objective of the invention is to present a communications solution for a wireless sensor network that enables reducing the overall power consumption of nodes to a level at which they do not necessarily need any batteries or other replenishable or replaceable energy sources but can scavenge their required energy from secondary sources, like vibration, ambient light, temperature differences or the like. Another objective of the invention is to present a communications solution that enables efficient network management for example by avoiding prohibitively network scanning times. Yet another objective of the invention is to present a communications solution that enables transmission power selection and/or transmission distance determination without having to repetitively measure the level of received signal power or similar explicit quantity.

For achieving the objectives of the invention, several aspects and viewpoints are considered. An advantageous arrangement for allocating communications resources is found to consist of a combination of frequency channelization and time slotted channel access, the latter meaning a combination of slotted MAC and time division multiple access and additionally involving a combination of random access and reservable slots. Power management is most advantageously based on transmitting certain beacon signals at least two power levels in succession, so that a receiving device can deduce, what is the minimum power level required for transmission over a certain wireless connection. Unnecessary network scanning is reduced by transmitting so-called idle beacons, which indicate time to a subsequent worthwhile reception time. Possibilities are provided for circulating the turn of acting in the most power demanding role among network nodes.

A wireless sensor network according to the invention is characterized by the features recited in the characterizing part of the independent claim directed to a wireless sensor network.

The invention applies also to a node device of a wireless sensor network, the node device being characterized by the features recited in the characterizing part of the independent claim directed to a node device.

Additionally the invention applies to a method for arranging communications in a wireless sensor network, the method being characterized by the features recited in the characterizing part of the independent claim directed to a method.

A wireless sensor network according to the invention has a topology that resembles a group of interconnected stars. A number of subnodes communicate with a headnode, thus constituting a cluster. Communications between clusters take place through connections between the headnodes of the clusters. Each cluster has a cluster-specific communications frequency for use in transmitting information between the subnodes and the headnode of the cluster. A cluster-specific time division multiple access scheme is applied within each cluster, containing both random access slots and reservable slots. Additionally there is a network-specific signaling frequency for use in transmitting network beacon signals.

Two kinds of beacon signals exist. Each headnode transmits network beacon signals on the network-specific signaling frequency according to a certain timetable. Additionally each headnode transmits cluster beacon signals on the cluster-specific communications frequency according to a certain timetable. Most advantageously a beacon transmission consists of at least two occurrences of a beacon frame in succession, each occurrence being transmitted at a different (but predetermined) power level. A receiving node finds out, which is the lowest transmission power level at which it still can receive the beacon frame properly, and uses this finding to estimate the distance between it and the node that emitted the beacon transmission, and/or the default power level it should use for transmitting information in the reverse direction to that node.

Each cluster has a so-called access cycle, which is a repetitively occurring period of time during which there occurs a certain active (TDMA-based) communications period and a relatively long idle period. This division into a communications period and idle period is generally known as slotted MAC. If a new subnode would like to join a certain cluster or if the headnode of another cluster would like to set up a connection with the headnode of said certain cluster, it must first perform network scanning, i.e. receive continuously or according to some reception timetable until it knows the timing and frequency used for transmission in said certain cluster. A required continuous reception period might become relatively long, if the idle period is continuous and occupies a major part of the access cycle. It is advantageous to transmit "idle beacons" during the idle period, announcing at least when the next communications period will occur. If each headnode transmits beacons at regular intervals ("beacon periods"), continuous reception for the duration of one beacon period should ensure that the timing and frequency of all neighboring clusters will be found out. A headnode may prefer to perform network scanning for the duration of a whole beacon period, while a subnode (or a headnode with low energy reserves) only needs to continuously receive until it receives the next beacon transmission, be it an actual beacon transmission or an idle one. In any case a useful maximum time limit for network scanning is one beacon period.

In order to operate as a headnode, a node device must have more extensive capabilities than what are needed for operating as a subnode. Therefore it would appear to be logical to provide two kinds of node devices, of which some would only join a wireless sensor network as subnodes while others would take on the responsibilities of headnodes. On the other hand, because operating as a headnode consumes more energy than operating as a subnode, and because the resources of available energy may be more or less equal for all node devices (especially if the nodes scavenge energy from their environment), it is advantageous if the nodes can circulate the headnode responsibility among themselves. This is possible only if there is an "excess" of nodes that are capable of operating as a headnode. A wireless sensor network according to the invention may consist of a mixture of two types of nodes, or alternatively of nodes of one type only that are all capable of operating as headnodes if required.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

DETAILED DESCRIPTION OF THE INVENTION

The following description will discuss various aspects of the present invention in more detail.

Network Topology

Figure 1:
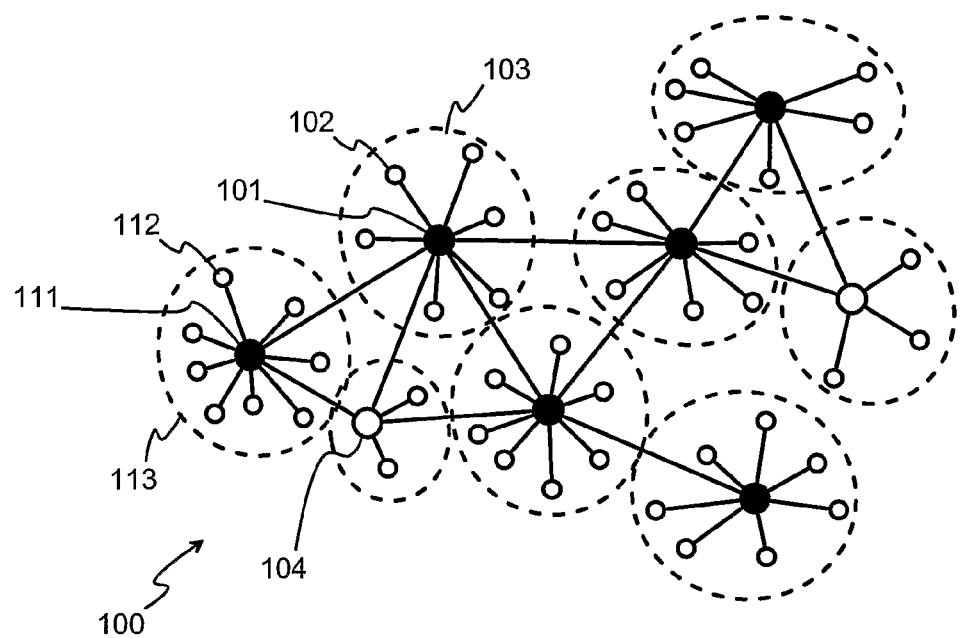
FIG. 1 illustrates an exemplary topology of a wireless sensor network according to an embodiment of the invention.

FIG. 1 is an exemplary graphical illustration of the topology of a wireless sensor network 100 according to an embodiment of the invention. There are a number of nodes that act as headnodes, shown as black circles, like headnodes 101 and 111. Each headnode has one or more subnodes 102 or 112, shown as small white circles, that communicate directly with the headnode. Together a headnode and the subnodes that communicate directly with said headnode constitute a cluster 103 or 113. Communications between clusters take place through peer to peer connections between the headnodes. Multi-hopping is supported and enables basically communications between an arbitrarily selected pair of nodes in the network.

Some of the nodes may act as sink nodes, meaning that they are users of information (while the other nodes are primarily producers of information) and may provide gateway connections to other systems and/or other networks. Sink nodes are shown as large white circles, like sink node 104. It is advantageous—though not mandatory—that a sink node acts as a headnode in the network topology. A sink node might be e.g. an actuator or a data concentrator that collects information produced by sensor-type subnodes and conveys it to a central processing unit. It is possible that a sink node makes requests for the network and collects only that information in which an actuator, a user or other party is currently interested. In order to limit the congestion on transfer paths leading to sink nodes it is advantageous to build into the network an inherent tendency of aggregating data. A sink node is not precluded from producing information; in other words the division into information producer nodes and information user nodes does not need to be definitive. Additionally it should be noted that sink nodes are not necessary for the operation of the wireless sensor network; it is also possible that a sink node is only brought to the network every now and then for collecting accumulated information.

Unlike the cells of cellular radio systems, a cluster is not meant to have a definite coverage area; neither is there any particular objective to provide extensive or continuous geographical coverage. Communications capability is only needed on areas where there are nodes, and on the other hand the nodes are adapted to bring along the required communications capability by themselves without outside configuration. The number of subnodes in any cluster may vary dynamically, new clusters may be set up, old clusters may be dissolved or divided, and the "backbone net" of connections between headnodes may change its topology depending on which of the node devices choose to act as headnodes. A wireless sensor network according to an embodiment of the invention is thus self-configuring and dynamically adaptive to changes such as appearance and disappearance of head- and subnodes, changes in the physical locations of the nodes, changes in signal propagation conditions between the nodes and so on. Further differences to cellular radio systems are found in the MAC protocol according to an embodiment of the invention, which will be described in more detail later.

Concerning the capabilities and functionality of the node devices, we may assume that there are so-called Reduced Functionality Devices (RFDs), which are only capable of acting as subnodes, as well as Full Functionality Devices (FFDs), which may act either as subnodes or as headnodes. The designations "RFD" and "FFD" are specific to the IEEE 802.15.4 LR-WPAN standard, so their use here should be considered to illustrate an exemplary parallelism, without requiring that the RFDs and FFDs of a network according to the invention should be exactly the same as in said standard. What an FFD must have as capabilities additional to those of RFDs include mainly routing and data aggregation, which will be described in more detail later. At least one FFD must exist in every cluster. If there are more, the FFDs may circulate the responsibility of acting as the headnode of the cluster. As an ultimate alternative all node devices in the network may be FFDs.

Medium Access Control in the Protocol Stack

Figure 2:
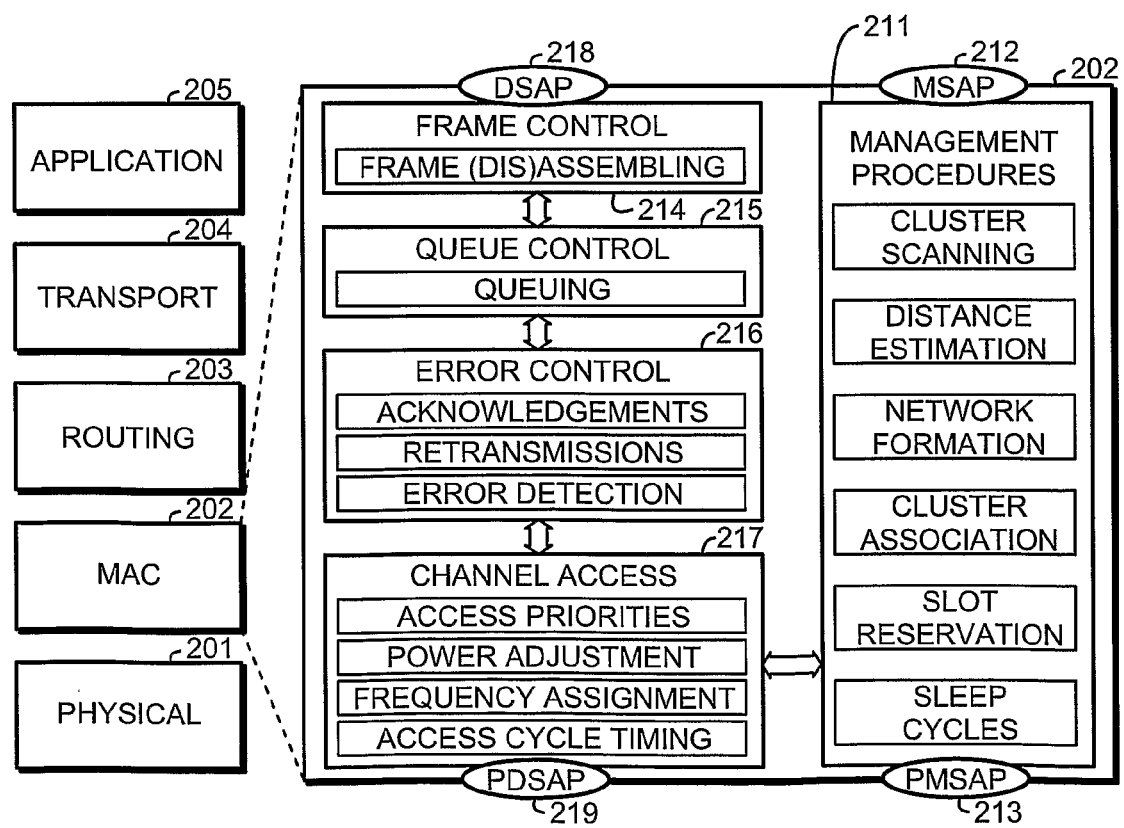
FIG. 2 illustrates protocol features in a wireless sensor network according to an embodiment of the invention.

An advantageous protocol stack that is suggested for use in a wireless sensor network according to an embodiment of the invention consists of five layers as presented in FIG. 2. At the bottom of the stack is a physical layer 201, which provides the methods of exchanging bits over the wireless medium. On top thereof is the MAC layer 202, which is described in more detail later. Upwards from the MAC layer 202 there is a routing layer 203, which manages multi-hop data forwarding between headnodes. Layer 203 is not used in a subnode. A transport layer 204 performs data fragmentation in transmission and defragmentation in reception, and is usually also given the task of supporting end-to-end communication between a data source and a destination. An application layer 205, which in sensor networks is tightly related to a sensor application, depends on the logical function of a node. In a subnode, the application layer consists of sample acquiring and preprocessing functions. In a headnode data fusion and resource distribution functions are included.

Details of the MAC layer 202 are presented on the right-hand side of FIG. 2. Service Access Points (SAPs) present the functional interfaces for accessing MAC protocol services and the physical layer. Management procedures 211 are executed on demand for forming and maintaining network topology and managing data transfer. Vertical management signaling with routing 203 and physical 201 layers is handled via a Management SAP (MSAP) 212 and a Physical Management SAP (PMSAP) 213 respectively. Functions associated to user data processing are grouped to frame control 214, queue control 215, error control 216 and channel access 217. A higher layer (routing 203) is accessed through a Data SAP (DSAP) 218 and the transceiver of the physical layer 201 through Physical Data SAP (PDSAP) 219. An exemplary implementation of the error control functionality 216 is a discarding 16-bit CRC (Cyclic Redundancy Check) with positive acknowledgements only and retransmission if acknowledgement has been requested but not obtained before the expiry of a predetermined timeout.

MAC frames are built (in transmission) and disassembled (in reception) by the frame assembly function, which also manages addressing. User data payloads are arranged in queues according to their priorities. The error control function 216 performs error detection, acknowledgements, and retransmissions. The channel access function 217 controls frame transmissions and receptions on RF channels using access cycle timing and frequency assignment functions. A power adjustment function selects either high or low TX power level according to transmission distance. Frame priorities are controlled by the access priorities function.

Even if the traditional concept of OSI modelling (Open Systems Interconnection) assumes the protocol layers to be relatively independent of each other, so that they only communicate with each other through well-defined inter-layer interfaces, in order to minimize power consumption it is more advantageous to consider the protocol stack as a whole. The most crucial decisions that directly affect energy saving are made regarding the MAC layer, so the other layers should be designed so that they adapt to and utilize the peculiarities of the MAC layer to the largest possible extent. For example, there should be as little control traffic created by the other protocol layers as possible, and such control traffic should adapt itself to the data rate, delay, frame size and other constraints imposed by the MAC layer. Limitations will affect especially the routing protocol. It is not possible to continuously change and update long routing tables. Optimal routes to all possible destinations cannot be continuously held in the memory of all headnodes. Most advantageously a reactive routing protocol will be used, which stores in memory the next hop address for each destination needed.

Access Cycle and Slot Structure

Figure 3:
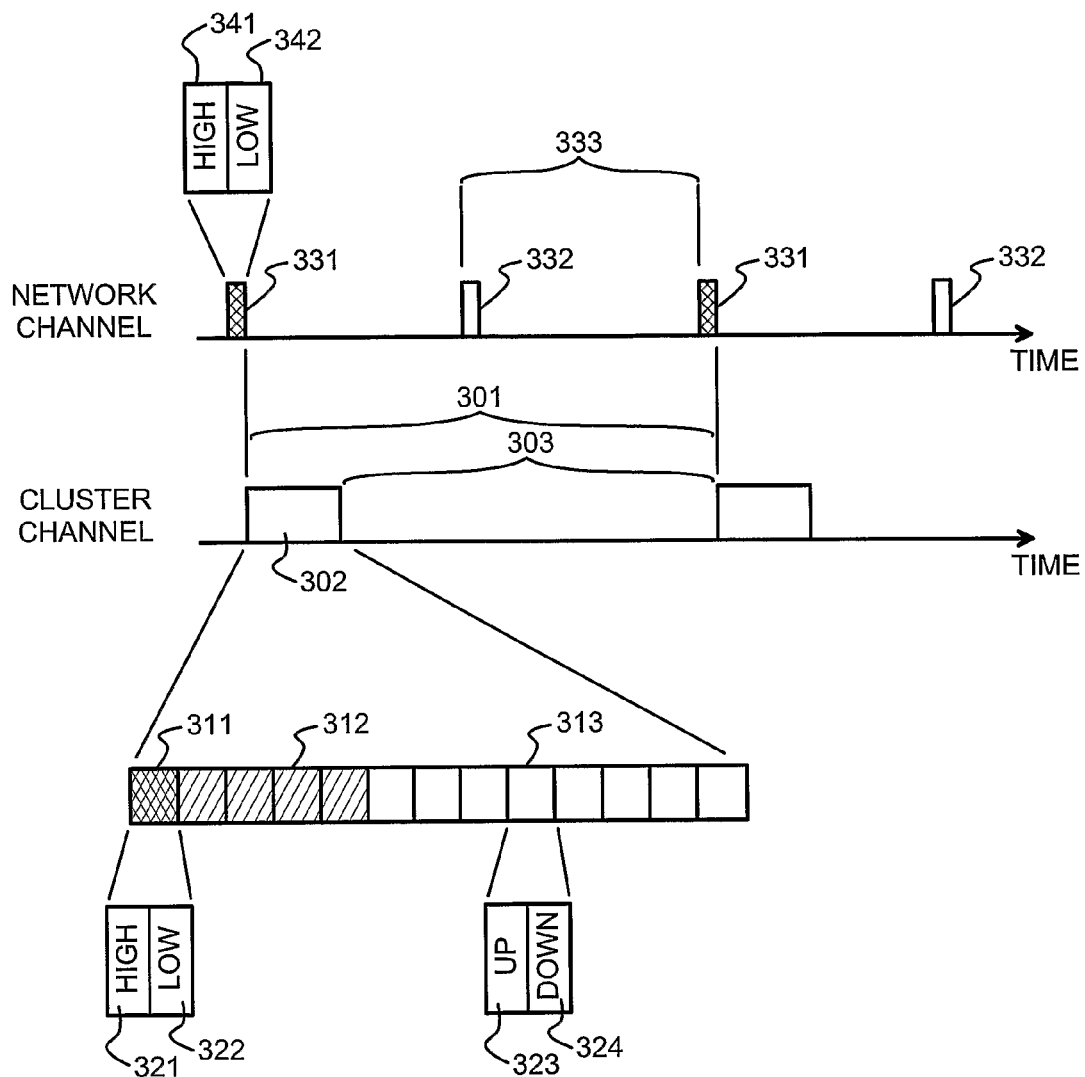
FIG. 3 illustrates an access cycle and a superframe structure according to an embodiment of the invention.

A basic unit of time in the transmission timetable of a cluster is the access cycle. According to FIG. 3, the access cycle 301 consists of a superframe 302 and an idle period 303. The relative length in time of the superframe 302 has been exaggerated for reasons of graphical clarity in FIG. 3; although the length of the access cycle 301 is a system parameter and may vary depending on desired throughput and delay values, the superframe 302 typically occupies a smaller relative portion of the superframe than in FIG. 3. As an example, the length of the access cycle 301 may be something between 1 and 10 seconds, while a suggested length for the superframe 302 is 260 ms.

The superframe 302 comprises a number of slots. The invention does not limit the number of slots in the superframe, but an advantageous value has been found to be 13 slots, each of which is 20 ms long in the exemplary 260 ms long superframe. According to an embodiment of the invention, the first slot 311 of the superframe is a cluster beacon slot, in which the headnode of the cluster transmits a cluster beacon signal. Of the remaining slots, it has been advantageous to designate some slots as random access or contention based slots, shown in simple hatch in FIG. 3, of which slot 312 is an example. Since the ALOHA protocol is a very well known example of simple contention based transmission, said slots can also be called the ALOHA slots. An exemplary number of ALOHA slots is four. The remaining slots, of which slot 313 is an example, are reservable slots. Although the embodiment of the invention which is considered to be most advantageous includes both ALOHA slots and reservable slots in the superframe, the invention basically does not exclude even superframes that only had slots of one of these types, in addition to the cluster beacon slot. Reservable slots are better than ALOHA slots in terms of energy efficiency, because only allocated reservable slots need to be received, which speaks in favor of having more reservable slots than ALOHA slots in the superframe. It is impossible to reliably predict the occurrence of transmissions in the ALOHA slots, which means that they must be received as a whole.

A planned use of the ALOHA and reservable slots involves mapping high priority traffic to reservable time slots on the MAC protocol, which enables reliability and a constant bandwidth. For normal priority traffic, ALOHA time slots are used. The ALOHA slots do not need reservation, and frame collisions may take place due to contention with other nodes. Acknowledgements and fast MAC retransmissions can be utilized for both traffic classes, which brings a trade off between reliability and energy consumption. The traffic priority and reliability classes and their mapping into time slots are presented in the following table.

| Traffic priority and reliability class | Time slots | | Acknowledgements | |
|---|---|---|---|---|
| | reservable | ALOHA | enabled | Disabled |
| High priority, high reliability | X | | X | |
| High priority, normal reliability | X | | | X |
| Normal priority, high reliability | | X | X | |
| Normal priority, normal reliability | | X | | X |

Data frames are arranged into two queues for high and normal priority traffic. The frames in queues are ordered according to their reliability classes, such that a high reliability class overtakes a normal reliability class. Also, ALOHA time slots may be utilized for high priority traffic, when a high priority traffic queue overgrows. Reservable time slots are assigned to nodes according to node priorities. It is assumed that headnodes transmit more important data than subnodes, and they have a high node priority. A normal node priority is typically assigned to subnodes.

Basically it would be possible to decide that the cluster beacon signal is transmitted at some other location within the superframe than at its very beginning. However, beginning the superframe with the cluster beacon signal has certain advantages. It is easy for the other nodes to synchronize themselves to the slot structure of the superframe when it begins with the cluster beacon signal. Additionally since the cluster beacon signal preferably contains the most recent information about the slot allocations concerning the reservable slots, it is good for the other nodes to receive this information before the occurrence of the slots used for exchanging data.

Further it has been found advantageous to consider each slot as consisting of a first half and a second half. Concerning the cluster beacon slot 311, the first half 321 is used to transmit a cluster beacon frame at a first power level (here a high power level) and the second half 322 is used to transmit an essentially identical copy of the same cluster beacon frame at a second power level (here a low power level). The use of different power levels is related to determining the distance between nodes and the required transmission power for other transmissions, which will be described in more detail later. The halves of the ALOHA slots and reservable slots are allocated for uplink and downlink transmission. In this exemplary case the first half 323 of a reservable slot 313 is the uplink half, and the second half 324 is the downlink half respectively.

Making the uplink and downlink halves (or more generally: uplink and downlink transmission instants) follow each other very quickly and in this order facilitates selecting the transmission power for the downlink transmission on the basis of a transmission power used for the uplink transmission. A node making an uplink transmission will select its uplink transmitting power on the basis of how well it can receive beacon signals from the node to which it is transmitting, as will be described in more detail later. The selected uplink power is most advantageously announced in a header field included in the uplink transmission. The node that receives the uplink transmission reads the value of said header field and selects the corresponding downlink transmitting power. The closeness in time of the uplink-downlink transmission pair ensures that signal propagation conditions have probably remained essentially the same.

Additionally the closeness in time of the uplink and downlink slots—as well as the fact that the suggested slot length is longer than the actual time it takes to transmit a frame—together enable a possible fast retransmission scheme, in which a negative acknowledgement (or the absence of a positive acknowledgement even if one was requested) for an uplink transmission triggers an immediate repetition of the uplink transmission during the remainder of what is actually time originally allocated for downlink transmission. If increasing transmitting power is possible, it is usually advantageous to use higher transmission power for the immediate repetition than what was used for the original uplink transmission.

Using downlink slots is not always necessary; at least if the primary task of a network is to convey data quite unidirectionally from subnodes to the direction of sinks. However, maintaining routing information necessitates in most cases that downlink transmission is at least possible, although downlink capacity does not need to be symmetrically equal to uplink capacity. Additionally for reliable communication acknowledgements after data frames are necessary. In such cases it is advantageous to combine the acknowledgment and possible downlink data in a common frame. Hence, the downlink part does not reduce channel utilization and energy efficiency significantly. The creation of downlink data links on demand bases would most probably reduce energy efficiency much more. Moreover, efficient channel utilization is not a primary concern in WSNs, since data rates are very low.

A node that should receive data in a reservable slot or must check an ALOHA slot in order to find out, whether it contains a transmission, does not necessarily need to keep its receiver on for the whole duration of the slot. If a transmission is found, the receiver can be turned off immediately after a frame has been completely received (assuming that the slot length is larger than the frame length). Since each node is most preferably adapted to make its transmissions at the very beginning of a slot, concerning an empty slot it suffices for the receiving node to listen for the duration of a certain time window before it can deduce that no transmissions are coming. The length of said time window may be expressed as t+p, where p is the time it takes to transmit a frame and t is an additional time marginal used to compensate for synchronization errors and oscillating crystal tolerances. For example, values of t=100 microseconds and p=256 microseconds can be used. A cost and energy trade-off calculation can be made: by using a more accurate (and more expensive) crystal oscillator a smaller value of t can be selected, which reduces energy consumption.

In addition to transmitting cluster beacon signals and emitting downlink transmissions within the appropriate slots of the superframe 302, a headnode transmits network beacon signals on a network channel. In order to only require the headnode to have a single radio transmitter, it is advantageous to schedule the transmission of the network beacon signals to take place during the idle period 303. In the exemplary embodiment of FIG. 3 a headnode transmits a so-called active network beacon signal 331 once during each access cycle 301. Here the transmission of the active network beacon signal 331 is scheduled to take place at the very end of each access cycle, so that the active network beacon signal 331 will be immediately succeeded by the transmission of the cluster beacon signal at the beginning of a superframe. Additionally the headnode transmits a number of so-called idle network beacon signals 332 during the rest of the idle period 303. Here the number of idle network beacon signals per access cycle is one, but it could be zero or more than one. The beacon period 333 is the length of time between the beginning of a network beacon signal and the beginning of the next network beacon signal. If the headnode transmits network beacon signals at exactly constant intervals, the beacon period 333 is a well-defined constant, and its inverse can be called the beacon rate. If network beacons are transmitted at varying intervals, a mean beacon period and a corresponding mean beacon rate can be calculated.

Using Idle Beacon Transmissions to Save Power

We may analyse the purpose of the so-called idle beacon transmissions (exemplified above through the idle network beacon signals) in more detail. A common assumption concerning wireless networks is that keeping the number of transmissions per time cycle as small as possible leads to largest savings in energy. However, this is not completely true. Making a certain number of "unnecessary" beacon transmissions helps to keep the time required for network scanning short, which may result in saving much more energy that will be consumed by making said transmissions. Contrary to a common belief, a radio transceiver consumes easily more power in receiving than in transmitting. An exemplary node device according to an embodiment of the invention consumes 20.07 mW of power in transmitting at a power level of −20 dBm, 30.68 mW in transmitting at 0 dBm and 44.98 mW in receiving, when the microcontroller of the node device is in active mode. Additionally we must keep in mind that beacon transmissions are brief and occur according to a well-defined schedule, while network scanning is essentially continuous and lasts for an unforeseen time until either it produces a result or a timeout occurs, and that there are potentially many more subnodes that need to perform network scanning than there are headnodes making beacon transmissions.

Figure 4:
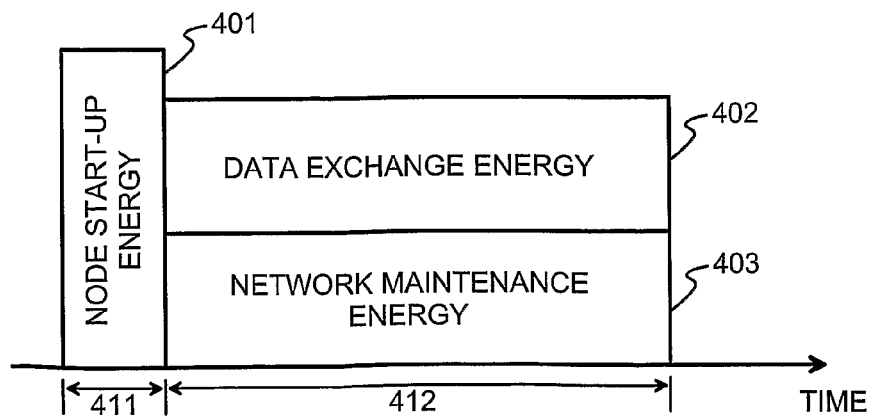
FIG. 4 illustrates the schematic division of energy consumed for various purposes.

FIG. 4 illustrates a schematic division of the energy a node consumes in wireless communications into start-up energy 401, data exchange energy 402 and network maintenance energy 403. Of these, the start-up energy 401 consists of network scanning and beacon receptions for detecting nodes in a range as well as network association, which means the exchange of transmissions required to connect the node to the network. The time interval 411 during which the start-up energy 401 is consumed may be designated as the node start-up period. The data exchange energy 402 consists of transmissions and receptions that are required for conveying upper layer payload data and acknowledgements. The network maintenance energy 403 is spent in transmitting and receiving beacon signals as well as performing periodic network scanning for updating network topology information. The period 412 within which the node spends the data exchange energy 402 and network maintenance energy 403 is the node lifetime, during which the node is available for active participation in network operation.

The vertical dimensions of the blocks 401, 402 and 403 are exemplary and do not relate to any quantitative meaning or information about actual energy or power. Overall power consumption is easily highest during the node start-up period 411, because once the node has acquired sufficient knowledge about the communications timetables and required power levels, it can effectively apply various power saving strategies during the node lifetime 412.

The relative importances of the start-up energy 401, the data exchange energy 402 and the network maintenance energy 403 to the energy budget of a whole network depends on the nature of the network. In a highly dynamic network with very short node lifetimes it may be even the start-up energy 401 that dominates. However, in typical cases node lifetimes may be months or even years, in which case the relative importance of the start-up energy 401 remains negligible.

In order to mathematically model the energy consumption of a network we need certain definitions. The energy $E_{tx}$ used to transmit a frame of data is $$E_{tx} = L_f E_t + \left(T_{st} + \frac{L_f}{R}\right) P_{tx}, \qquad (1)$$

where
$L_f$=frame length in bits
$E_t$=energy needed to exchange one bit of data between the node controller and the transceiver
$T_{st}$=length in time of a start-up transient period of the transceiver
R=radio data rate in bits/second and
$P_{tx}$=power consumption in transmitting mode, when also the node controller is in active mode.

We expect the average power consumption during the transceiver start-up period to be the same as $P_{tx}$. If there are multiple possible values for the transmission power level, these directly affect $P_{tx}$, which in turn is seen as multiple values of $E_{tx}$. For the sake of example we assume there to be a high transmission power level and a low transmission power level, resulting in different values $E_{tx(high)}$ and $E_{tx(low)}$. The frame reception energy $E_{rx}$ is $$E_{rx} = \left(T_{st} + T_i + \frac{L_f}{R}\right) P_{rx} + L_f E_t, \qquad (2)$$

where $T_i$=length in time of an idle listening period and
$P_{rx}$=power consumption in receiving mode, when also the node controller is in active mode.

If network scanning always results in successfully receiving the next available beacon signal, the worst-case network scanning time is essentially equal to the inverse of the beacon rate $f_b$ (we may also assume that a headnode will always perform network scanning for the whole beacon period, while a subnode may quit scanning immediately after having found a suitable cluster, where "suitable" means that the headnode of the cluster is close enough and the cluster does not appear to prohibitively highly loaded). Thus we may express the network scanning energy $E_{ns}$ as $$E_{ns} = \left(T_{st} + \frac{1}{f_b}\right) P_{rx}. \qquad (3)$$

Actually the expression above is an approximation, because it does not take into account the energy used for transferring the received data from the radio transceiver to a processing unit of the node. The difference is negligible, however, because the transceiver must be in stand-by mode (and not in reception mode) while data is transferred to th processing unit. The time it takes to load one frame of received data is around 1 ms.

For the purpose of the following calculations we assume that data exchange operations have higher priority than beacon transmissions, so that data exchange energy is not effected by beacon rate. A node start-up sequence consists of network scanning (which may result in receiving several network beacon signals until a suitable cluster is found, but is assumed to be limited to one beacon period), network beacon reception, cluster beacon reception, association frame transmission and acknowledgement reception. We assume the association frame to be transmitted on the low transmission power level mentioned above. The expression for a node start-up energy $E_s$ is thus $$E_s = E_{ns} + 3E_{rx} + E_{tx(low)}. \qquad (4)$$

This shows the node start-up energy to be inversely proportional to the beacon rate $f_b$. With the exemplary values of $L_f$=256 bits, $E_t$=2.3 nJ/bit, $T_{st}$=250 μs, R=1 Mbps, $P_{tx(high)}$=30.68 mW, $P_{tw(low)}$=20.07 mW, $T_i$=300 μs and $P_{rx}$=44.98 mW we get a node start-up energy of 4.6 mJ for a 10 Hz beacon rate and 45 mJ for an 1 Hz beacon rate.

Network maintenance operations are performed continuously during entire network lifetime. Hence, it is most convenient to consider the energy consumption over 1 s periods of operation, which equals to average power consumption. Average network maintenance power $P_m$ is defined as a sum of network scanning power $P_{ns}$ and beacon exchange power $P_b$. Besides the network scanning energy, $P_{ns}$ depends on the required rate of network scanning operations that enables adequate data routing in the network. This depends on network dynamics and is defined as network scanning interval $T_s$. As headnodes use longer communication distances and more complex data routing, they are assumed to perform network scanning more frequently than subnodes. Hence, the network scanning interval is defined separately for headnodes ($T_{s(h)}$) and subnodes ($T_{s(s)}$). $P_{ns}$ is averaged per node, which takes into account the number $n_s$ of subnodes per each headnode. Hence, network scanning power is obtained by $$P_{ns} = \frac{E_{ns}}{1 + n_s}\left(\frac{1}{T_{s(h)}} + \frac{n_s}{T_{s(s)}}\right). \qquad (5)$$

Figure 5:
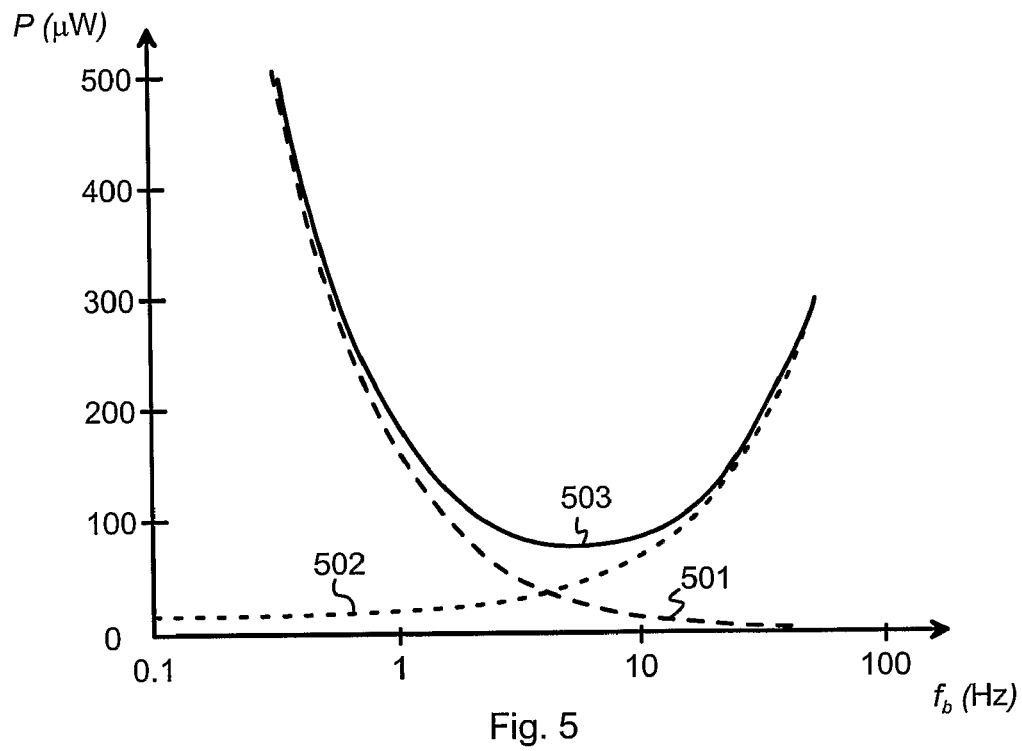
FIG. 5 illustrates certain considerations related to beacon rate optimization.

In order to obtain tangible results, we may fix $T_{s(h)}$, $T_{s(s)}$ and $n_s$ at some exemplary values, like 100 s and 500 s respectively for the network scanning intervals and $n_s$=four subnodes per each headnode. Additionally we assume the length $T_{ac}$ of an access cycle to be 4 s. In FIG. 5, curve 501 illustrates the network scanning power $P_{ns}$, which decreases rapidly as the beacon rate $f_b$ increases. A decrease from 160 μW to 16 μW is obtained as beacon rate increases from 1 Hz to 10 Hz.

Beacon exchange power is consumed by beacon transmissions and receptions. Besides network beacons transmitted at the rate $f_b$, cluster beacons are transmitted once per access cycle, the length of which is $T_{ac}$. For simplicity, cluster beacons are assumed to be received from one headnode only. As noted earlier, for power control reasons it is advisable to always transmit beacon frames twice, first using the higher power level and thereafter the lower. Thus the power $P_b$ consumed by beacon exchange can be modeled as $$P_b = \frac{E_{tx(high)} + E_{tx(low)}}{1 + n_s}\left(f_b + \frac{1}{T_{ac}}\right) + \frac{2E_{rx}}{T_{ac}}. \qquad (6)$$

The variation of $P_b$ with $f_b$ is also plotted in FIG. 5 as curve 502. In contrast to network scanning power, the beacon exchange power $P_b$ can be minimized by minimizing $f_b$. The beacon exchange power $P_b$ decreases from 71 µW to 23 µW as $f_b$ decreases from 10 Hz to 1 Hz. As seen in the figure, network maintenance power $P_m$, which is plotted as curve 503, has a minimum (77 µW) at 5.6 Hz beacon rate. At low beacon rates below 1 Hz, $P_m$ typically doubles as the beacon rate halves. The effect is reversed at high beacon rates above 10 Hz.

Next, we consider the effect of network scanning interval and the number of subnodes per headnode on maintenance power consumption. Clearly, the increase of the network scanning interval reduces the power for network scanning and shifts the $P_m$ minimum to lower beacon rates. As an example when $f_b$ is 1 Hz, $P_m$ increases from 55 µW to 833 µW as $T_{s(h)}$ decreases from 500 s to 20 s. On the other hand, the increase of $n_s$ reduces average power per node consumed for beacon transmissions. As subnodes have typically longer network scanning interval than headnodes, also network scanning power consumption is reduced. When $f_b$ is 1 Hz, the increase of $n_s$ from 0 to 8 reduces $P_m$ from 500 µW to 150 µW.

An average node power consumption in a wireless sensor network without network scanning may be for example in the order of 100 µW. Hence, network maintenance power consumption has a very significant effect on entire network lifetime. In the following we now enforce the assumption about long node lifetime (i.e. the start-up energy remains negligible to total node energy consumption). Optimal beacon rate $f_b^*$ is determined by minimizing the network maintenance power with respect to the beacon rate. An optimization function can be written as $$P_m = \frac{P_{rx}\left(T_{st} + \frac{1}{f_b}\right)}{1+n_s}\left(\frac{1}{T_{s(h)}} + \frac{n_s}{T_{s(s)}}\right) + \frac{E_b\left(f_b + \frac{1}{T_{ac}}\right)}{1+n_s} + \frac{2E_{rx}}{T_{ac}}, \quad (7)$$

where $E_b = E_{tx(high)} + E_{tx(low)}$. It can be shown that there exists a unique minimum at $f_b^*$ that is obtained by setting $dP_m/df_b = 0$ in (7). This yields $$f_b^* = \sqrt{\frac{P_{rx}}{E_b}\left(\frac{1}{T_{s(h)}} + \frac{n_s}{T_{s(s)}}\right)}. \quad (8)$$

Hence, the optimal beacon rate is determined by network parameters $T_{s(h)}$, $T_{s(s)}$ and $n_s$, and radio parameters $E_b$ and $P_{rx}$.

Figure 6:
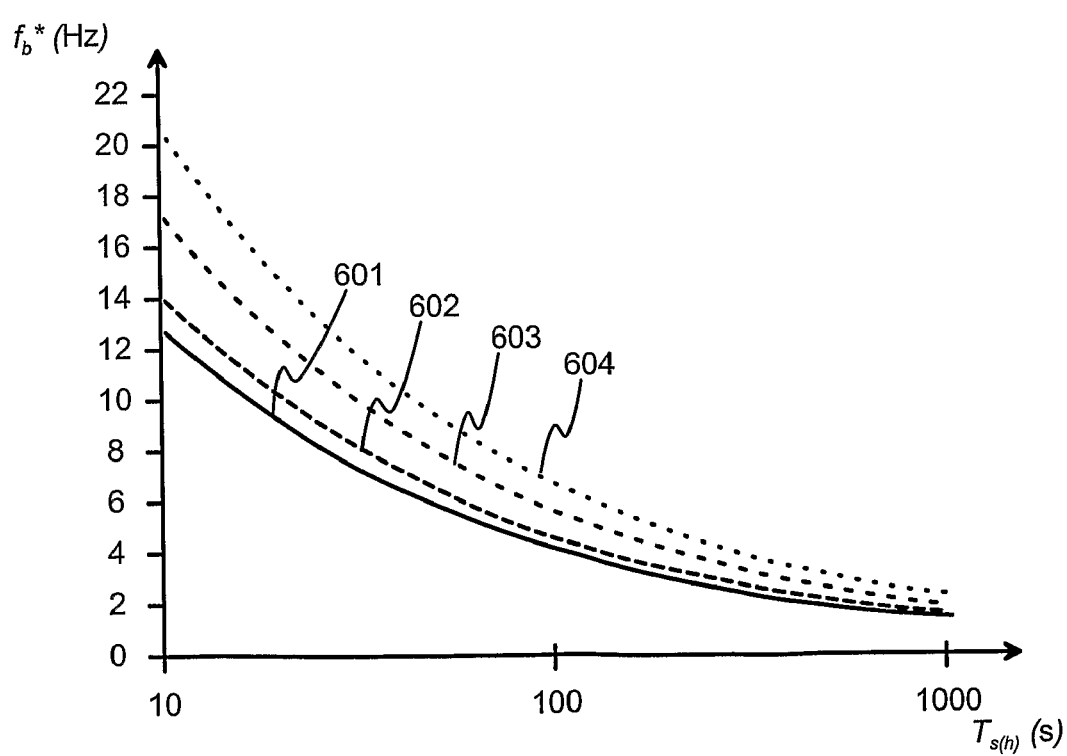
FIG. 6 illustrates certain other considerations related to beacon rate optimization.

FIG. 6 presents the variation of $f_b^*$ with $T_{s(h)}$, with values of $n_s$ as 0 (curve 601), 1 (curve 602), 4 (curve 603) and 8 (curve 604). The relation $T_{s(s)}/T_{s(h)}$ is fixed to 5. For the given parameters, optimal beacon rate $f_b^*$ varies between 2-21 Hz. The increase of subnodes per a headnode raises optimal beacon rate. Although this increases headnode power consumption, overall network power consumption is reduced due to shorter network scanning operations.

Figure 7:
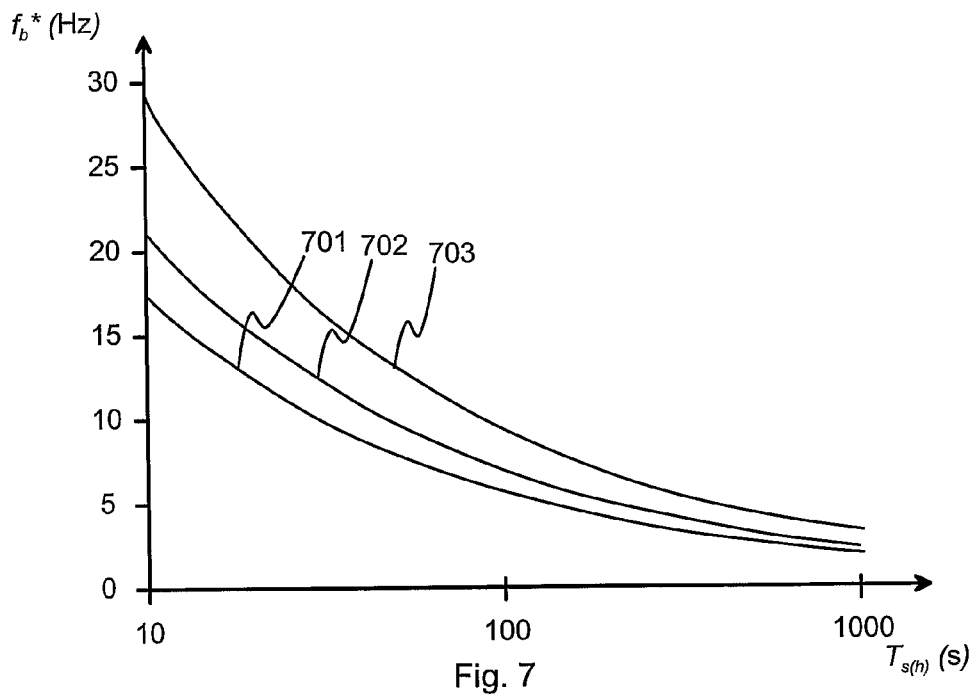
FIG. 7 illustrates certain yet other considerations related to beacon rate optimization.

FIG. 7 presents $f_b^*$ as a function of $T_{s(h)}$, as the $T_{s(s)}/T_{s(h)}$ ratio equals 2 (curve 703), 5 (curve 702) and 10 (curve 703). Clearly, the reduction of the $T_{s(s)}/T_{s(h)}$ ratio increases optimal beacon rate, since network scanning operations are performed more frequently. When $T_{s(h)}$ is 100 s and $T_{s(s)}/T_{s(h)}$ reduces from 10 to 2, optimal beacon rate increases from 5.5 Hz to 9.2 Hz.

As a conclusion of this subsection we may note that the beacon rate of a wireless sensor network has a very significant effect on maintenance power consumption, which is defined as the sum of beacon exchange power and network scanning power. Beacon rate is optimized in respect of required network scanning interval determined by network dynamics and data routing algorithm. Estimations depict that network maintenance power ranges from below 100 µW to even several milliwatts, for which beacon rate has the most significant influence. For the exemplary case discussed above, optimal beacon rate in typical applications and a reasonably stable network is around 5 Hz. For a dynamic network that requires frequent network scanning, optimal beacon rate is in the order of 20 Hz. The utilized optimization function does not consider collisions in the network channel, which become noteworthy at higher beacon rates and dense networks. Hence, it is reasonable to prefer beacon rates below 10 Hz. Most importantly the findings concerning optimization of the beacon rate are generic and can be applied to previously known wireless sensor network solutions, such as the LR-WPAN standard as well as the S-MAC and T-MAC protocols. As a rule of the thumb, in solutions like LR-WPAN additional beacons transmitted during coordinator inactive period would effectively reduce network scanning time, if the beacon interval would otherwise be long, over 1 s. In dense and large networks, an optimal beacon rate would be somewhat lower than in the discussion above due to higher collision probability.

Time Synchronization

Although the clusters are asynchronous with respect to each other, a capability of spreading a network-wide time reference among the nodes is advantageous especially if measurement values or other data should be time-stamped, which helps to avoid mixups when measurement data that originates from different sources or has traveled through different routes is fused and aggregated. For example, timestamping makes it possible to deduce the speed and direction of movement of a moving target that produces measurement results at various sensor nodes at different time instants. This may additionally require information about the locations of at least some of the nodes; location awareness is easily achieved for example by programming certain fixed nodes to know their coordinates and to announce them in their data messages to the sink node(s).

A natural requirement for time synchronization is that it must be achieved with a minimum possible number of transmitted and received control messages, i.e. with a minimum possible energy consumed on distributing the time reference.

According to an embodiment of the invention, network beacon signals and cluster beacon signals are used to propagate a time reference through the wireless sensor network with a desired accuracy, such as one microsecond. We assume that there is one node in the network which has exceptionally good access to accurate external reference time. Typically that node is a sink node, or it may be a dedicated time reference node equipped with an accurate clock, a GPS receiver or similar time source.

Network beacon signals and cluster beacon signals may have different roles in propagating the time reference. According to one suggestion, a network beacon frame contains an absolute, complete time expressed with e.g. 48 bits, which with the exemplary resolution of one microsecond would mean an overall expressible time span of about nine years. A cluster beacon frame might contain a so-called short time, which only included a number (such as 16 bits, meaning a 65 milliseconds time span with one microsecond resolution) of the least significant bits of the complete time. The time stamp contained in a beacon frame should express the time at which that beacon frame was transmitted.

In addition to the time stamp proper, it is advantageous to include in the beacon transmission an indicator of how accurate the time reference is believed to be. A simple indicator is a time hops field, the value of which is zero at the node acting as a reference time source and increases with one at each node that forwards the time reference. A more elaborate indicator might also include an indication of how long time has passed since the transmitting node received a time reference from somewhere closer to the reference time source, because drift occurs in all crystals that acts as local clocks in the nodes. If a node has multiple received time reference transmissions to choose from, it should always select the one in which the indicator indicates best possible accuracy of the time reference.

At least two basic alternatives are available for use as the strategy of putting a received time reference into use. According to a simple alternative a node simply receives a beacon transmission, reads the time stamp and—at least if the accuracy indicator fulfils some acceptance criteria—simply takes the time reference into use as an indicator of the exact time at which the beacon signal was received. Even if taking the time reference into use included adding some default delay, this simple alternative will inevitably result in some timing inaccuracy, because the time it takes for the transmission to propagate through the air and through the transmitting and receiving hardware, including MAC processing, is not exactly known. However, the achieved accuracy is in many cases sufficient, if the network does not include any applications that would depend on exact synchronization.

According to a more elaborate and more accurate alternative, a first node transmits a time reference in a cluster beacon at a time $t_0$. A second node receives this cluster beacon and stamps the reception time as $t_1$ according to its own clock. The second node stores the times $t_0$ and $t_1$ but does not yet update its own clock according to the time reference. In an uplink transmission slot the second node transmits a data frame to the first node at a time $t_2$, which the second node again stores. The first node stamps the reception of said data frame as $t_3$ and sends a number of least significant bits of the time stamp $t_3$ to the second node in an acknowledgement frame. Now the second node knows all times $t_0$, $t_1$, $t_2$ and $t_3$ and may calculate a propagation time $t_{propagation}$ as follows:

$$t_{propagation} = \frac{(t_1 - t_0) + (t_3 - t_2)}{2}. \quad (9)$$

Now the second node may update its own time t as follows:

$$t = t + (t_0 - t_1) + t_{propagation}. \quad (10)$$

We may note that transfer delays are typically shorter than 1 millisecond. Thus for transferring the time $t_3$ in an acknowledgement frame it should suffice to reserve something like 12 to 16 bits; 12 bits would mean a possible time range of ±2 ms, while 16 bits is sufficient for ±32 ms. A maximum of 16 bits reserved for this purpose is not an excessive reservation from a frame. However, if this principle of distributing the time reference is selected, such a reservation should be made for downlink frames. In order to avoid complications it is advantageous to make all nodes of a wireless sensor network always apply the same selected principle of distributing the time reference.

If the original reference time source was a sink node, the time reference typically propagates downwards in the tree-like network hierarchy in a reverse direction compared to the propagation of data upwards through the sink node. If the optimal path (derived from factors like overall energy, headnode loading, link quality) between a node X and the sink node is long and said node X needs a more accurate time reference, it may obtain it from a GPS-equipped (or otherwise specifically capable) nearby node by listening regularly to the (network or cluster) beacon signal transmissions of that node. Node X must thus remain conscious about the timing and frequency of both the GPS equipped node and that adjacent headnode through which it transmits data towards the sink node. In order to keep overall energy consumption at minimum it is not advisable to increase network scanning.

Frame Structures

Figure 8:
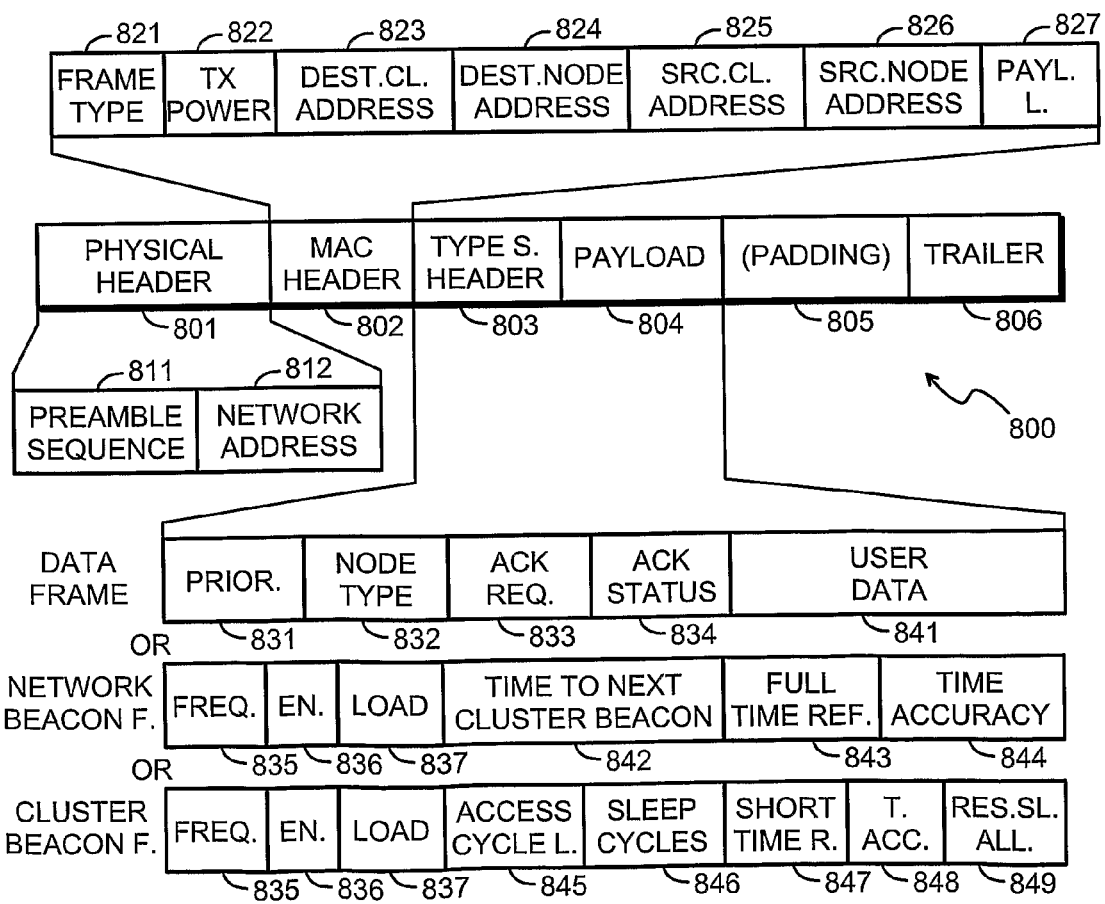
FIG. 8 illustrates frame structures in a wireless sensor network according to an embodiment of the invention.

FIG. 8 illustrates an advantageous frame structure 800 that can be used for transmissions in a wireless sensor network according to an embodiment of the invention. Utilizing a fixed length frame format slightly reduces the energy efficiency of the transceiver compared to an alternative possibility of allowing the frame length to vary depending on the number of actual bits to be transmitted. However, fixed length frames simplify memory management and header decoding, and improve the robustness of the TDMA scheme.

An exemplary selection of frame types specifies 13 frame types, which are mapped into three MAC frame formats. A network beacon frame type uses a network beacon frame format. Correspondingly a cluster beacon frame type uses a cluster beacon frame format. All other frame types (i.e. data, association, slot reservation, acknowledgement, combined association & slot reservation, combined acknowledgement & slot reservation, combined data & association, combined data & slot reservation, combined data & acknowledgement, combined data & association & slot reservation, and combined data & acknowledgement & slot reservation) use a data frame format. Aggregating data, association, acknowledgements and reservations to common frames should be used whenever possible, if only because the transient energy required to start up a transceiver is of the same order of magnitude as the energy required for the transmission proper. Said aggregating also helps to minimize delays caused by topology changes in the network, because data can be transmitted immediately with the appropriate control message (such as an association or slot reservation message). Aggregating is most advantageously also used by headnodes that convey simple data messages (such as measurement results) from several subnodes towards a sink node, so that the payloads and suitable node identification data is combined to common frames if possible.

All frames are 32 bytes long, consisting of a physical header 801, MAC header 802, type specific header 803, payload 804, padding 805 (if required) and a trailer 806. Exemplary lengths for said fields are 40 bits for the physical header 801, 64 bits for the MAC header 802, 136 bits together for the type specific header 803, payload 804 and padding 805, as well as 16 bits for the trailer 806.

A physical header 801 consists of a preamble sequence 811 (e.g. 8 bits) for transceiver bit synchronization, and a network address 812 (e.g. 32 bits) used for distinguishing actual frames from background noise and for identifying a single wireless sensor network. A MAC header 802 begins with a frame type code 821 (e.g. 4 bits). A TX power field 822 (e.g. 4 bits) specifies the transmission power used for the current frame. Address fields include a destination cluster address 823 (e.g. 16 bits), a destination node address 824 (e.g. 8 bits), a source cluster address 825 (e.g. 16 bits) and a source node address 826 (e.g. 8 bits). A payload length field 827 (e.g. 8 bits) ends the MAC header 802.

The formats of a type specific header 803 and a payload 804 depend on the frame type. Unused payload is filled by padding 805 for keeping the frame length fixed. The length of the padding 805 can be derived from the payload length field

827 of the MAC header 802. At the end of each frame, a trailer 806 is used for error detection.

The type specific header of a data frame begins with a priority field 831 (e.g. 1 bit), which describes payload data priority level. A node type field 832 (e.g. 1 bit) defines whether the transmitting node is a subnode or a headnode. An acknowledgement for a current data frame is requested by an ack request field 833 (e.g. 1 bit). An ack status field 834 (e.g. 1 bit) is for acknowledging a previous data frame. If a longer ack status field is used, or if the ack status bit in field 834 just prompts the receiving device to look for an acknowledgement message in the payload part of the frame, or if acknowledgement is accomplished by sending specific acknowledgement frames, the acknowledgement might also include a sequence number or other identifier of the data frame that is being acknowledged. A data frame payload contains user data 841 transferred between upper protocol layers.

The type specific header for network and cluster beacons begins with a frequency field 835 (e.g. 8 bits) that defines the RF channel of the cluster. An energy field 836 (e.g. 8 bits) defines headnode energy reservoir. The loading of the cluster, resulting from the number of associated subnodes, data routing activity, and data aggregation, is specified by a load field 837 (e.g. 8 bits). According to energy and load information, new subnodes can select the most suitable headnode. A payload in beacon frames is type specific. A network beacon payload contains a field 842 (e.g. 32 bits) for announcing the time to next cluster beacon, for example in 100 μs resolution. Hence, other nodes may return to sleep mode until the beginning of a next superframe. Additionally the network beacon payload contains a field 843 (e.g. 48 bits) for distributing the full time reference, as well as a field 844 (e.g. 8 bits) for transmitting a time accuracy indicator. A cluster beacon payload specifies an access cycle length 845 (e.g. 32 bits) in 100 μs resolution for maintaining cluster synchronization, possible sleep cycles 846 (e.g. 8 bits) for temporarily suspending communication in a cluster, a short time reference 847 (e.g. 16 bits), a time accuracy indicator 848 (e.g. 8 bits) and a reservable time slot allocation table 849 (e.g. 64 bits), which specifies current slot reservations.

Management Procedures

Management procedures of a wireless sensor network specify mechanisms for supporting network self-configuration and energy conservation. The mechanisms include cluster scanning, distance estimation, network formation, cluster association, slot reservation and sleep cycles. The first four of these are schematically shown as parts of FIGS. 9a and 9b.

Figure 9A:
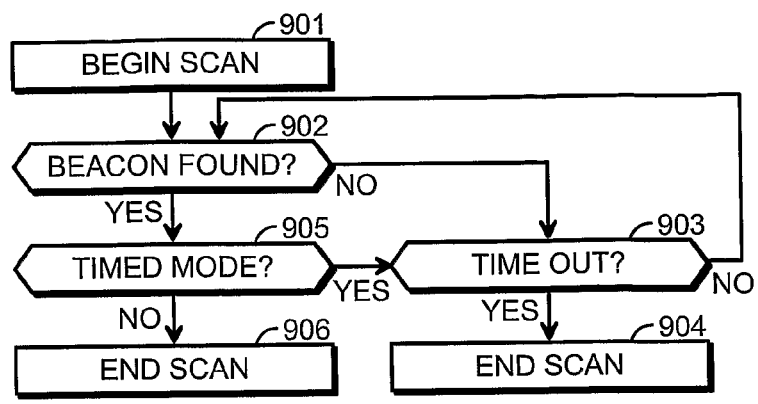
FIG. 9a illustrates aspects of network scanning according to an embodiment of the invention.

A cluster scanning procedure is used when a node needs to discover a neighboring cluster for association or data forwarding. In FIG. 9a the cluster scanning procedure is illustrated as steps 901 to 906. After having initiated the scanning at step 901, a node listens to the network channel in the loop consisting of steps 902 and 903, trying to receive network beacons from neighboring clusters. Energy consumption for scanning is significant, since the transceiver is in the idle listening and RX mode for a long time. Depending on the configuration, the scanning may be finished after one network beacon period ("timed mode"), during which time network beacons are received from all neighboring clusters with a high probability. Thus the node has gone through steps 902, 905 and 903 at least once before ending at step 904. The other alternative is to stop scanning immediately after a suitable cluster has been found (i.e. an idle or active network beacon has been received), which in FIG. 9a corresponds to a transition from step 905 to step 906.

Figure 9B:
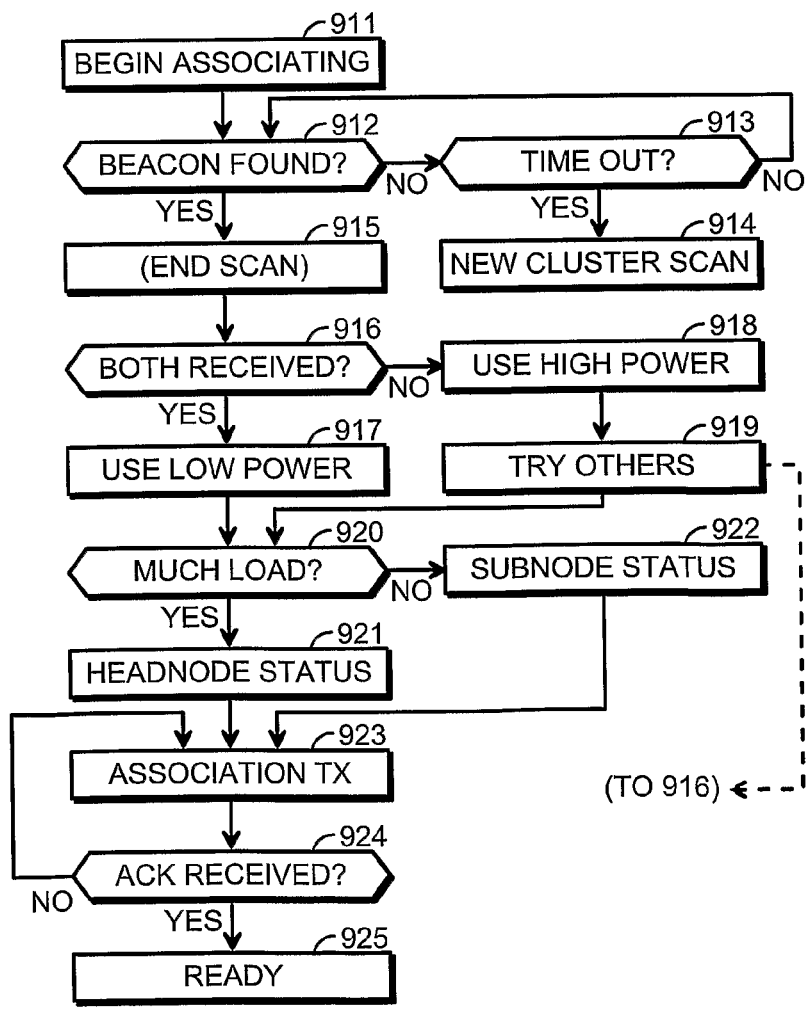
FIG. 9b illustrates aspects of node association according to an embodiment of the invention.

FIG. 9b illustrates the process of associating with a headnode. For robustness, a subnode should associate with its nearest headnode. After beginning at step 911 the node that wants to associate listens to the cluster frequency it has read from a previously received network beacon. Also the time for beginning the cluster association process has been determined by reading the appropriate value from a previously received network beacon. Only if the reception of a cluster beacon will not succeed, there occurs a transition through steps 912 and 913 to a new cluster scan at step 914. Otherwise the node stops receiving at step 915 immediately after having successfully received a cluster beacon.

An RSSI measurement is typically not included by default in low-power transceivers; neither is it recommendable because it would increase receiver complicatedness and power consumption. As noted before, according to an embodiment of the invention all beacons in the suggested protocol are transmitted twice using different transmission power levels (for example 0 dBm and −20 dBm), yielding different transmission ranges. If both beacons are deemed to have been received successfully at step 916, a node estimates to be in the near proximity of a headnode, and selects the lower transmission power for its own transmissions according to step 917. Otherwise a node is far from a headnode and communication takes place with the higher transmission power according to step 918. In the last-mentioned case a subnode also begins to discover if a nearer headnode is available according to step 919. If another headnode is found, conceptually there occurs a jump back to step 916. However, it is well possible that there are only "distant" headnodes available, so the node may need to content itself with communicating with one of them at the higher transmission power level. In that case, it is advisable to perform a network scan every now and then, at a rate that may be higher than in cases where a nearby headnode is already available, in order to find out whether there is some other headnode with which the node could communicate on the lower transmission power level.

It is possible to use more than two transmission power levels, either by transmitting more than two beacon frames—each at different power levels—within each beacon signal transmission, or by using cyclic selection of beacon transmission levels so that a first beacon signal transmission would comprise two beacon frames at power levels 1 and 2 respectively, the next beacon signal transmission would comprise two beacon frames at power levels 3 and 4 (or 1 and 3) respectively, the next one at power levels 5 and 6 (or 1 and 4) respectively and so on until all power levels would have been used. The receiving nodes would estimate their distance and required transmission power level according to the lowest level beacon transmission that they could receive successfully.

When a node is activated for the first time it performs the cluster scanning procedure. An FFD may establish an own cluster and become a headnode, or associate with an existing cluster and become a subnode. The decision depends on the loading and the energy state of the found clusters, and also the estimated distance to them. The decision is schematically shown as steps 920, 921 and 922 in FIG. 9b. An RFD may obviously only associate with an existing cluster, because it is not capable of operating as a headnode. A cluster establishment at step 921 consists of the selection of a cluster address and a cluster RF channel, according to the information obtained from neighboring clusters. Once a cluster is established, other nodes and existing clusters may associate with it, and form global network connectivity.

A cluster association is required for exchanging data with a cluster headnode. A subnode can only associate with one cluster, while a headnode needs to associate with several neighboring clusters for forming efficient multi-hop connectivity. A node associates after receiving cluster beacons by transmitting a cluster association request in an ALOHA slot at step 923. If a headnode receives and accepts the request, it transmits an acknowledgement and a node address in the downlink part of the slot. Receiving the acknowledgement at the associating node is shown as step 924 in FIG. 9*b*. Since the network is prepared to have high dynamics, separate network disassociation requests are not used. A node is automatically disassociated from a cluster, if a headnode cannot receive data from a node during a number of access cycles. Said number is a parameter available for selection by the network designer and can be for example ten.

A node may reserve a reservable time slot by transmitting a slot reservation request in an ALOHA time slot. If a headnode receives the request, it usually transmits an acknowledgement in the downlink part of the slot (although a requesting node may specifically ask for no acknowledgement to be transmitted, similarly as in any other case where a node wants to take power saving to the utmost by even not having to keep on its receiver for receiving acknowledgements). The slot allocation proper, if one is to be given, will come in the next cluster beacon signal from that headnode. The reservable slots are allocated according to requested priority levels, while preferring headnodes. The allocation is specified in cluster beacons, and is updated on each access cycle. If a headnode cannot receive data in an appropriate reservable slot during four access cycles, or the slot is assigned to a higher priority node, the previous slot reservation is automatically removed. A headnode can set a whole cluster to an idle state for one or more access cycles by using the sleep cycles field in a cluster beacon. During sleep cycles, all communication in a cluster is temporarily suspended. The sleep cycles allow additional energy saving at the cost of increasing transfer delay.

The network channel is typically predetermined. Under conditions containing serious interference it is possible to predetermine a number of network channels, one of which is selected and used as long as it remains possible. The responsibility of deciding the selection among a number of predetermined network channels, as well as the responsibility of determining when it is time to change the network channel, typically rests on a single, important node, which usually is also a sink node. When a new node joins a network the network channel of which may be any of a number of possible channels, it scans through the possible network channels until it finds one where network beacon transmissions are available for receiving, and continues to use (and scan) that network channel as long as it appears to be operative.

The principle selected for network scanning is very important from the viewpoint of energy consumption. The wireless sensor network according to the invention utilizes short activity periods and long sleep times. The clusters are asynchronous with respect to each other and operate on different frequencies, which necessitates finding out the transmission timetables and frequencies of neighboring nodes. Listening to their network beacon signals on a network channel according to the previous description is much more energy efficient than some prior art practices, in which a node must listen through all possible frequencies long enough to hear some traffic or beacons.

Basically it is possible to replace the frequency division between clusters with code division, in which all clusters would use a common transmission frequency but different cluster-specific (and/or node-specific) spreading codes to avoid inter-cluster collisions. However, since CDMA requires extensive synchronization and somewhat more complicated transceiver architecture, it is expected to be a feasible alternative only for some very specific applications.

Data Transfer

A communications protocol for a wireless sensor network comprising clusters must specify mechanisms for exchanging user data in intra-cluster (i.e. between nodes that belong to the same cluster) and inter-cluster (between nodes that belong to different clusters) communications. A subnode or a source headnode is associated with a sink or destination node, which most typically is a headnode. Data exchanging is performed during the destination cluster superframe and the source cluster idle time, and using ALOHA or reservable time slots. For sharing network resources more equally between nodes, subnodes can preferably utilize only one time slot per access cycle, thus achieving 132 bits per access cycle throughput. To allow efficient inter-cluster communication, the slot utilization of headnodes is not limited. Thus, the maximum throughput with eight reservable data slots is 1056 bits per access cycle.

Figure 10:
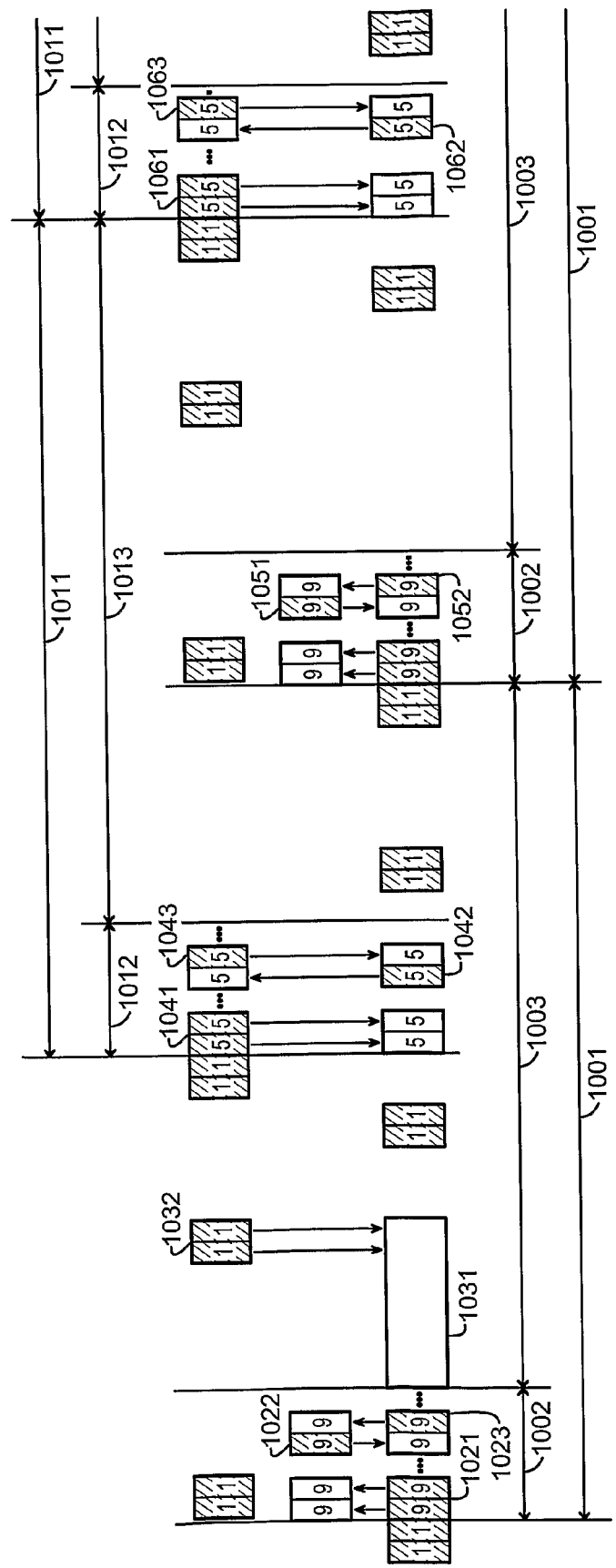
FIG. 10 illustrates data transfer in a wireless sensor network according to an embodiment of the invention.

Inter-cluster communications from a subnode through headnode1 to headnode2 with an example of a slot reservation procedure is presented in FIG. 10. A hatched block illustrates transmitting and a white block receiving. The lowest row of blocks illustrates the radio activity of headnode1, the topmost row of blocks illustrates the radio activity of headnode2, and the middle row of blocks illustrates the radio activity of the subnode. Time proceeds from left to right in the drawing. Headnode1 and headnode2 operate on cluster channels 9 and 5, respectively. Network signaling is performed on channel 1. The reference designators 1001, 1002 and 1003 designate the access cycle, superframe period and idle period respectively of the cluster of headnode1. Similarly the reference designators 1011, 1012 and 1013 designate the access cycle, superframe period and idle period respectively of the cluster of headnode2. Both headnodes transmit idle network beacons twice on their access cycles. The relative lengths of time periods in FIG. 10 are not to scale.

A subnode1, previously associated with headnode1, receives the cluster beacon transmissions 1021 of headnode1 and transmits data using an ALOHA slot 1022 and a pure data frame type. Headnode1 responds by transmitting an acknowledgement in the downlink part 1023 of the same ALOHA slot. Assuming that headnode1 does not already know the timing of a suitable next-hop node or cluster, an inter-cluster communication begins by the cluster scanning 1031. The scanning is completed when idle network beacons 1032 are received from headnode2, which is the selected (next-hop) destination. Next, having read the appropriate timing from the received idle network beacons 1032, headnode1 receives cluster beacons 1041 on channel 5 and transmits a combined data & association & slot reservation type frame using one ALOHA slot 1042. The headnode2 responds by an acknowledgement frame 1043 that contains the node address it assigns to headnode1. Sending the data right away in said combined frame enhances overall energy efficiency and minimizes delays compared to a case where the associating node should perform association first and begin transmitting data only thereafter.

On the next superframe of the cluster of headnode1, a data frame 1051 is received from subnode1, and acknowledged at 1052. We assume that the subnode did not request a reservable slot, so the data frame 1051 comes again in an ALOHA slot. Now headnode1 is already an associated node of the cluster of headnode2, so it only needs to receive cluster beacons from headnode2 at 1061, and transmit a data frame in a reservable time slot 1062. Headnode2 replies with an acknowledgement 1063.

As seen in the figure, the inter-cluster communication does not significantly increase a destination headnode duty cycle, which simplifies the energy management. All in all, the active time of a transceiver in a headnode is in the order of few percent of the length of an access cycle, while for a subnode it is in the order of few per mil. A source headnode is loaded by the cluster scanning. However, energy consumption is reduced by idle network beacons. After the cluster association, inter-cluster communication is energy efficient. Intra-cluster communication is not disturbed, since inter-cluster communication is performed on cluster idle time. Also, subnode duty cycle is low, requiring only three receptions and one transmission per access cycle.

Routing

The routing protocol to be selected depends slightly on the preliminary information that is available concerning the expected topological nature of the wireless sensor network. The following example is based on assumptions according to which the network only contains relatively few sinks compared to the overall number of nodes, and messages from the sinks towards the other nodes are very seldom node-specific but usually concern the whole network or some section thereof. A reactive routing principle is preferred, according to which the routing protocol only supports storing routing information concerning certain destinations that are known to be needed. Each node only needs to maintain a next-hop routing table, instead of memorizing complete routes to destinations. For a subnode the next-hop routing table is particularly simple, because the next hop to anywhere is the connection to the headnode of the cluster. Sequence numbers of frames and multipath routing support are preferred, so that it is possible to enhance the reliability of routing important data by passing it through alternative paths.

According to a simple exemplary alternative, a sink node which is interested in temperature readings from the coverage area of the network sends a request for temperatures in a data frame that also contains an identifier of the sending sink node. The request proceeds through the network according to the flooding principle. In order to avoid loops and duplicates the frame contains a sequence number. Each headnode forwards the request to all other nodes it can hear except that from which it came. A hop counter is updated in the frame that contains the request: when a headnode starts forwarding a request it received, it increases the value of the hop counter by one.

Each node that receives said request stores the value of the hop counter at reception, the identifier of the originator (sink) node and that of the node from which the request was most recently received. Thus a record in a routing table consists of a destination identifier, a next-hop identifier and a hop count. If the headnode receives later a copy of the same request with a higher hop count value, it discards the later request without forwarding it. Correspondingly if the headnode receives a copy of the same request with a lower hop count value, it erases the previous record from the routing table and replaces it with one containing the hop count and transmitting node identifier obtained from the later reception. At the time of designing the routing protocol it is also possible to define that (at least if the hop counts of the two received copies are closer to each other than a predefined limit) the receiving headnode makes a record on the basis of both received copies of the request, which records can then be later used for multipath routing.

Flooding the network with the request will die out by itself when all headnodes have received and forwarded it. When a node that knows itself to include a temperature sensor receives the request, it obtains a temperature reading and transmits—according to the information in its routing table—a frame containing its source identifier, the temperature reading, possibly location (with reference to other nodes) and possibly a time stamp towards the sink node that made the request. By observing the contents of these reverse direction transmissions the headnodes that are located on the routing path towards the appropriate sink node can again produce records to their routing tables, said records containing next-hop entries concerning routing to the node from which the temperature reading originated. From time to time the sink node may transmit new requests in order to get all routing information updated.

Prototype Node Device

Figure 11:
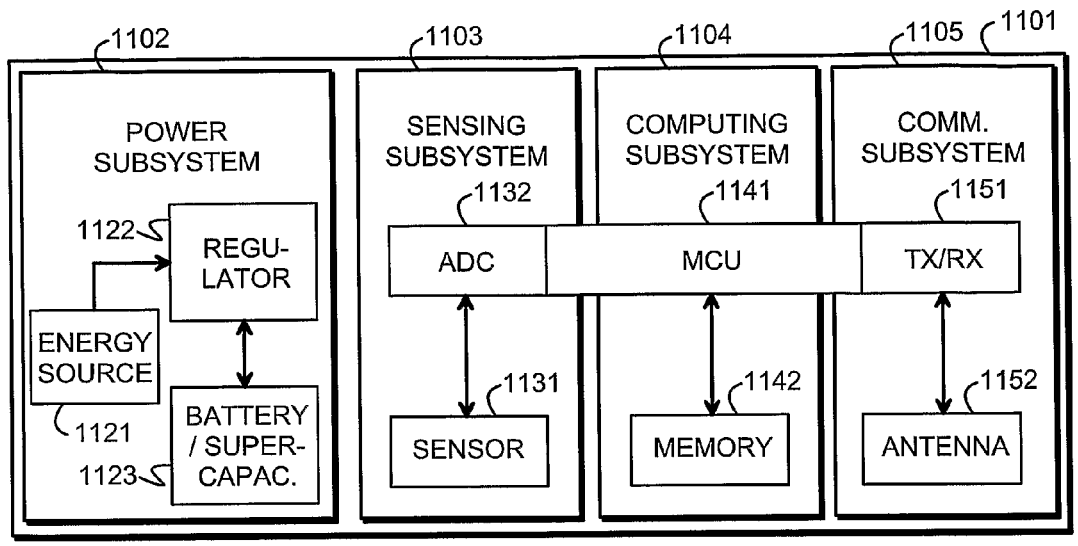
FIG. 11 illustrates an exemplary node device according to an embodiment of the invention.

FIG. 11 illustrates the architecture of an exemplary node device 1101 according to an embodiment of the invention. A computing subsystem 1104 is adapted to execute the MAC protocol, the upper protocols and application algorithms depending on available performance and memory. An exemplary physical implementation of the computing subsystem comprises a Xemics XE88LC02 microcontroller unit (MCU) 1141, which consists of a CoolRisc 816 processor core, a 16-bit ADC 1132, 22 kB internal program memory and 1 kB data memory. An external memory 1142, for example an 8 kB electrically erasable programmable read-only memory (EEPROM), provides a non-volatile data storage. The maximum instruction execution speed of said exemplary MCU is 2 MHz.

A communications subsystem 1105 comprises an RF transceiver 1151, an antenna 1152 and the part of MCU 1141 that executes the communication protocols. An exemplary physical implementation of the communications subsystem 1105 utilizes a 2.4 GHz NordicVLSI nRF2401 transceiver. An exemplary transmission data rate is 1 Mbps. The transceiver 1151 has integrated pattern recognition and 16-bit CRC functions, and a data buffer for transmission and reception. The pattern recognition is most advantageously used to detect a network address. The CRC of the radio transceiver significantly eases the workload of the MCU error control, since only acknowledgement and retransmission mechanisms need to be implemented in software.

A sensing subsystem 1103 most advantageously takes use of the internal ADC 1132 and of the MCU 1141. Said ADC has typically pre-amplification and offset compensation stages, which increase sampling accuracy. A typical maximum sample rate using 16-bit resolution is around 2 kHz. The MCU 1141 may be used for implementing an ADC driver and sample transmission tasks for the application layer. As a sensor 1131 nearly any type of sensor may be used depending on the application.

The power subsystem 1102 may be designed in various ways. The exemplary design of FIG. 11 comprises an energy source 1121, which may be for example an ambient energy scavenging circuit based on piezoelectric phenomena, or a photovoltaic cell. A regulator 1122 is used to regulate the supply power provided to the rest of the node device. Although a switch mode regulator would have higher efficiency, a linear regulator such as a TPS71525 linear voltage regulator may still be preferable due to its lower quiescent current, lower noise, lower electromagnetic interferences and smaller size. As a temporary storage of energy and a peak demand reservoir there may be used a rechargeable battery or a supercapacitor 1123. In a prototype device a capacitor of 0.22 F has been used.

The dimensions of said prototype are 31 mm×23 mm×5 mm. The top side of a printed circuit board in the prototype contains the transceiver, antenna, EEPROM, sensor, and connectors. MCU and regulator are mounted on the bottom side. Prototype power consumption measurements are presented in the following table.

| MCU mode | ADC mode | Sensor mode | Radio mode | Power (mW) |
| --- | --- | --- | --- | --- |
| Active | Active | Active | Receive data | 46.06 |
| | | | Transmit data (Power: 0 dBm) | 31.76 |
| | | | Transmit data (Power: −20 dBm) | 21.15 |
| | | | Data loading | 3.74 |
| | | | Sleep | 2.43 |
| | | Off | | 2.41 |
| | Off | | | 1.35 |
| Sleep | | | | 0.019 |

The minimum power consumption is 19 µW, when the system is in the sleep mode, while the maximum is 46.06 mW, when all components are active, and the transceiver is in the RX mode. The MCU power consumption is 1.33 mW at 1.8 MHz clock speed. The radio transceiver consumes 33 times the power of MCU. Data reception needs nearly twice the power of transmission. In wireless sensor networks the power consumptions of the sleep and RX modes are the most important.

Figure 12:
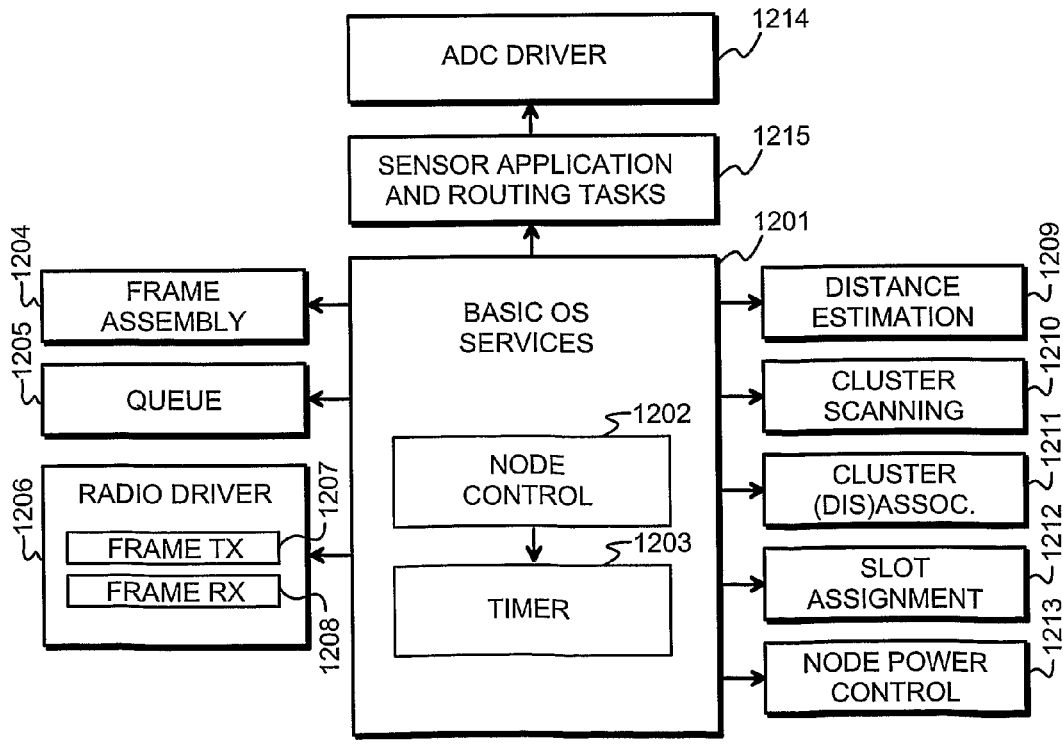
FIG. 12 illustrates software architecture in a node device according to an embodiment of the invention.

FIG. 12 illustrates an exemplary software architecture for a node like that illustrated above in FIG. 11. The basic operating system services 1201 comprise, among others, a general node control state machine 1202, the operation of which is scheduled by a timer 1203. The node control state machine 1202 performs MAC function calls depicted as arrows. The frame assembly 1204, queue 1205 and radio driver 1206 (including frame TX 1207 and frame RX functions 1208) are associated to data and control flow. Management functions on the right side of FIG. 12 are executed on demand and include distance estimation 1209, cluster scanning 1210, cluster association and disassociation 1211, slot assignment 1212 and node power control 1213. The ADC driver 1214 controls sensor sampling and constitutes a specific part of sensor application and routing tasks 1215, which in the protocol stack belong to the applications layer. Software can be developed using any available development tool, such as a Raisonance Integrated Development Environment (RIDE). Exemplary software developed with said tool and an A c816-gcc (ver. 2.8.0) compiler with optimization level 1 resulted in a headnode MAC implementation size of 14 kB, requiring 137 B of data memory. A subnode version of the software requires 13 kB program memory and 109 B data memory. The data memory requirements do not include frame queues.

Power Consumption and Performance

In the research work that lead to the invention power consumption was estimated in a five node network where two subnodes (subnode1, subnode2) are associated with a headnode1. The headnode1 receives data frames from the both subnodes. The received data frames are concatenated in one data frame, which is routed to headnode3 via headnode2. Data frames are transmitted on reservable time slots. The estimation includes subnode1, headnode1, and headnode2. The cluster association and slot reservation procedures are excluded.

Since the inter-cluster communication takes place in cluster idle time, shorter than 1 s access cycle lengths are not convenient. The maximum access cycle length is set to 10 s. The network beacon period is fixed to 250 ms. During an access cycle, subnode1 receives two cluster beacons, and transmits a data frame, and optionally receives an acknowledgement from headnode1. The headnodes transmit network and cluster beacons, receive ALOHA slots and allocated reservable time slots, and forward data to a neighbour headnode. Acknowledgements are used for each data frame.

In the estimated power consumptions subnode1 achieved the lowest power consumption. Using the longest 10 s access cycle, subnode1 consumes 31 µW with acknowledgements, and 27 µW without acknowledgements, while headnode1 and headnode2 power consumptions are 171 µW and 166 µW, respectively. When using the shortest 1 s access cycle, the power consumption of subnode1 increases to 140 µW with acknowledgements, and 103 µW without acknowledgements. At the same time headnode1 and headnode2 power consumptions are 574 µW and 526 µW, respectively.

As a comparison, a real power consumption measured from a prototype of a subnode1 is from 36 µW to 134 µW with acknowledgements, and from 22 µW to 97 µW without acknowledgements. Headnode1 and headnode2 power consumptions are from 312 µW to 850 µW, and 283 µW to 855 µW, respectively. The power consumptions of headnodes are higher than estimated. That is caused by the higher MCU and receiver activities than modelled due to quite complex timing management and synchronization inaccuracy. These cannot be precisely modelled in the estimations. However, subnode1 power consumption estimation is accurate. As the access cycle length increases, subnode1 approaches quickly the sleep mode power consumption.

Throughput between two nodes has been analysed as a function of access cycle length, as the number of utilized reservable time slots is increased from 1 to 8. Highest throughput is achieved using the shortest 1 s access cycle length. As each data frame carries 132 bits user data, the maximum throughput using 8 reservable time slots is 1056 bps. Due to the downlink slots, the throughput is symmetric for both directions, achieving 2112 bps maximum total throughput. The throughput from a subnode to headnode ranges from 13.2 bps to 132 bps, as access cycle length reduces from 10 s to 1 s and only one reservable time slot is allowed. It should be noted that contrary to some earlier assumptions, it is not advisable to transmit data at a low bit rate if energy is to be saved. Quite to the contrary, transmissions—especially beacon transmissions that are meant to be received by a large number of recipient nodes—should be made at a relatively high transmission rate (such as 1 Mbps) so that the time of keeping on the receivers of the receiving nodes can be kept as short as possible.

An average protocol delay for transferring a data frame between two nodes is approximately a half of the access cycle length, when the offered throughput is below the estimated MAC protocol throughput. In this case, MAC protocol queues are emptied on each superframe.

The estimation can be extended to a larger network with four clusters, each having seven associated subnodes. Data is forwarded between clusters to a sink using three reservable data slots per cluster. Five subnodes in each cluster are assigned in reservable time slots, while the remaining two subnodes per cluster are transmitting frames in ALOHA time slots. Acknowledgements are used for each data frame. The network beacon period is 250 ms. For simplicity, collisions and frame errors are not considered in the estimation. The power consumptions of subnodes and headnodes are estimated in the function of achieved throughputs.

One direction throughputs are determined from subnode to headnode, and between headnodes. Maximum throughputs for a subnode and a headnode are 132 bps, and 396 bps, while consuming power 140 µW and 977 µW, respectively.

Assuming that a subnode acquires 16-bit samples at 1 Hz sample rate, a 16 bps throughput is required from a subnode to a headnode. According to measured results from prototypes, this results in 8.2 s access cycle length and 34 µW subnode power consumption for the required throughput. Headnode power consumption using the same access cycle length is 230 µW achieving a 48 bps throughput for data forwarding. Hence, average power consumption per a node is 59 µW. Due to the large number of subnodes, data aggregation should be applied on headnodes. As 2 s transfer delay per hop is required, the access cycle length is reduced to 4 s. This results in 33 bps maximum throughput and 50 µW power consumption for subnodes. The headnode throughput and power consumption are 99 bps and 340 µW. Average power consumption per a node increases to 86 µW. This energy can be obtained from a 1 $cm^3$ sized lithium battery lasting slightly over one year.

The energy can also be scavenged e.g. from a 5.5° C. temperature difference using a 1 $cm^2$ sized thermoelectric generator, or from the vibration of small machines, e.g. the casing of a microwave oven using a 1 $cm^3$ sized piezoelectric generator. As whole, the verified power consumption of a subnode is as low as 27 µW, when a 10 s access cycle length is used without acknowledgements. This results in about 5 s transfer delay and 13.2 bps throughput from a subnode to a headnode, which fulfills the requirements of most WSN applications. Maximum total throughput in two directions using reservable time slots is 264 bps between a subnode and a headnode, and 792 bps between headnodes.

Circulating Headnode Responsibility

Acting as a headnode will consume remarkably more energy than acting as a subnode. On the other hand, the mean number of subnodes per headnode has an effect on the optimum rate of making beacon transmissions: the higher the mean number of subnodes, the more frequently should beacon transmissions be made (see $n_s$ in equation 8). Thus, even if at first sight it would be advisable to only have the absolute minimum number of headnodes in a wireless sensor network according to an embodiment of the invention, increasing the mean number of subnodes per headnode may lead to a situation where the predetermined beacon transmission rate is not optimal any more. Additionally if one of the headnodes fails in such a network, the absence of redundant routes for inter-cluster communications will require relatively large amounts of network scanning by a number of nodes before full connectivity has been established again.

A lower limit to the number of headnodes is achieved either when the distance between adjacent headnodes becomes too long resulting in unreliable inter-cluster communications, which with the above-mentioned 2.4 GHz NordicVLSI nRF2401 transceivers means about 10 meters in indoor conditions, or the headnodes are not able any more to route the expected throughput from subnodes to sink(s) even if they aggregate data in transmission.

Two basic approaches exist. Firstly, it is possible to make the beacon transmission rate cluster specific, so that each headnode dynamically decides its own beacon transmission rate on the basis of the number of subnodes currently associated with it. If this is the case, then—considering energy consumption only—it is even advisable to program each FFD so that it will not act as a headnode if only it can avoid it. However, it is not advisable to allow any headnode to decrease its beacon transmission rate below a nominal value that determines the nominal beacon period the length of which should suffice for receiving at least one network beacon signal from any headnode close enough for its network beacons to be received. Dense sections of the network (>1 node/$m^2$) may benefit greatly from making beacon rate higher than said nominal value, because the achieved overall savings in required network scanning energy are much larger than the additional energy spent on the beacon transmissions. An upper limit for the beacon rate is encountered when collisions between network beacon signals from different headnodes become all too common.

A second alternative is to determine beforehand a certain nominal number of subnodes that each headnode should have in its cluster, and fix the beacon transmission rate on the basis of said nominal number of subnodes. As a consequence of this second alternative, if a new FFD reads the load indications from beacon transmissions of neighboring headnodes and notices that they all appear to have a full nominal number of subnodes already, it begins to act as a new headnode rather than squeezing itself in as an additional subnode to one of the previously existing clusters. Even if headnodes were not allowed to change the beacon rate on their own initiative, it is possible to define the beacon rate to be a network parameter that a commanding headnode may change by broadcasting a corresponding change message throughout the network.

A headnode is not obliged to follow its commitment, if the energy consumption required by headnode operation threatens to exhaust its energy resources below some predetermined threshold, or if the energy consumption rate exceeds the corresponding energy replenishment (i.e. scavenging) rate for some predetermined duration of time. Such a node device may simply refuse to operate as a headnode any more, and announce its retirement by not making beacon transmissions any more. The other nodes around it will notice that the previous cluster is not operative any more, and start looking for replacement connections. Eventually one FFD that previously operated as a subnode will notice that it can only receive beacon transmissions at the highest transmission power level, which means that it is relatively far from all existing headnodes, and decides to change over to the role of a headnode (most advantageously it has been programmed not to do so, or at least delay doing so as long as possible, if its own energy resources appear to be low). It announces its decision by making a cluster beacon transmission, after which it waits for other nodes around it to send their association frames. A previous subnode may also decide to become a headnode if it notices from cluster beacon transmissions that the loading of its previous cluster has become prohibitively high.

Should it happen that two FFDs decide exactly simultaneously to become new headnodes, their beacon transmissions will collide. Taken that the network channel will only contain the network beacon signals, which are very short (2×256 microseconds) in the suggested beacon transmission arrangement, the probability of a collision is small. However, if it is desirable to diminish it even more, it is possible to take advantage of the deterministic behaviour of the nodes: a decision to become a headnode will be made when certain criteria are fulfilled, which—concerning the effect of external factors—will take place at a certain common time instant. We may define that after the moment at which said criteria were fulfilled, each previous subnode waits for the duration of a delay, the length of which is either selected randomly or calculated with an algorithm that takes into account node energy (the more energy, the shorter delay), remaining headnodes known to the node (the less remaining headnodes known, the shorter delay; however requiring at least one remaining headnode to be heard in order to maintain connectivity) and/or node mobility (if a node knows itself to be highly mobile, it uses a longer delay). This way it is most probable that the new headnode will be the optimal choice in terms of energy requirements as well as network scaling and topology.

Congestion and Scalability

Even if there are a number of different frequency channels to choose from, in large networks it may happen that a new cluster simply cannot find a free frequency any more. In that case it may take the frequency channel on which it considers to be the least amount of existing traffic. The long idle period in the access cycles, together with the fact that network beacon signals are transmitted on a separate frequency, mean that a single frequency may well accommodate more than one cluster, as long as the newer headnode selects its superframe period to not overlap with those of the previous headnodes.

Contrary to a common belief, using TDMA to distribute available communications capacity does not keep the network solution from being scalable. The network has a clustered topology, where TDMA is applied inside clusters (intra-cluster communication). Scalability inside clusters is not a problem, since all cluster members (subnodes) are in the range of a cluster head (headnode). Also, a headnode controls the number of subnodes associated with it. Moreover, the ALOHA slots allow a large number of low activity subnodes to communicate with headnode on demand.

For inter-cluster communication the scalability problem is solved by distributing the TDMA control in network. Network wide TDMA schedules are avoided. A headnode wishing to communicate with another headnode associates with a neighboring cluster similarly than subnodes operating there.

Minimizing Data Latency in One Direction

If each headnode start the access cycle in its cluster at an arbitrary moment of time, access cycle starting moments (and thus e.g. cluster beacon transmission moments) will be evenly distributed over time. This has its advantages: for example, spreading the use of transmission time helps to avoid collisions and level out the radio interference experienced by other electronic devices nearby. However, it also results in the consequence that the average delay between inter-cluster hops is essentially one half of the length of the access cycle. If the wireless sensor network is large and the access cycle is long (say, 10 seconds), the resulting overall delay from generating data at a subnode to making that data available at a sink node may become prohibitively long. This delay, which comes from the fact that every node that forwards the data must just wait for the next suitable transmission moment is commonly known as data latency.

Figure 13:
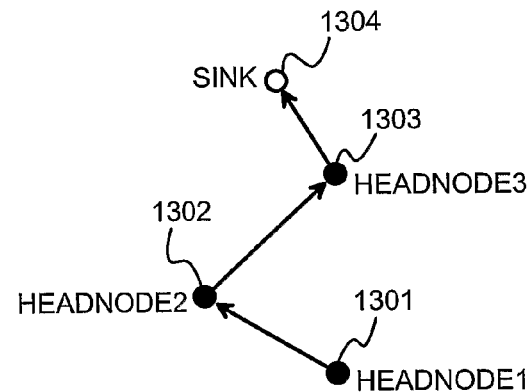
FIG. 13 illustrates certain headnodes that take part in data latency minimization and FIG. 14 illustrates transmission timetables of the nodes of FIG. 13.
Figure 14:
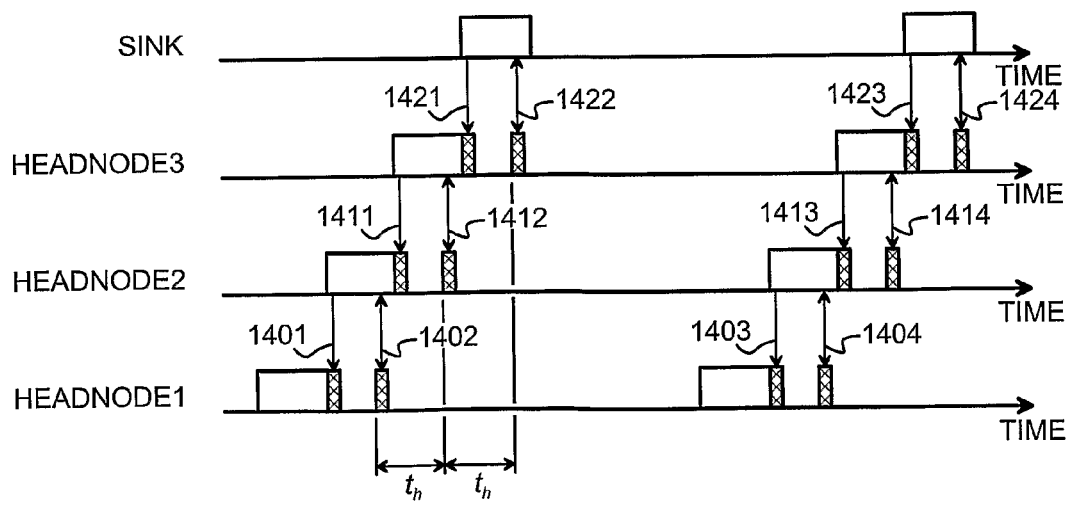

A simple, yet effective measure is available for minimizing data latency as illustrated in FIGS. 13 and 14. FIG. 13 is a simplified network topology diagram where subnodes have been omitted. We assume that a subnode in the cluster of a first headnode 1301 generates data, which should be routed through second and third headnodes 1302 and 1303 to a sink node 1304. We assume further that a routing protocol has executed, resulting in each of the first, second and third headnodes 1301, 1302 and 1303 having stored an appropriate next-hop record for routing data towards the sink node 1304. The relatively small number of sink nodes in a typical wireless sensor network ensures that in a majority of headnodes the routing table only has a single entry for a next-hop towards a sink node.

According to FIG. 14, each headnode has timed its access cycle so that its own superframe, shown as a white block in FIG. 14, occurs immediately before the superframe of that other headnode that in a routing table represents a next-hop towards the sink node 1304. Transceiver activity that does not belong to a headnode's own superframe but relates to communicating with an adjacent node is illustrated as thin hatched blocks. If the first headnode 1301 has acquired some data from a subnode in a slot of the superframe that occurs first in FIG. 14, it can receive a cluster beacon 1401 from the second headnode 1302 immediately thereafter as well as forward the data and receive an acknowledgement at step 1402 still during the same superframe of the second headnode 1302. The same rapid succession of cluster beacon reception and data forwarding with acknowledgement is repeated at steps 1411 and 1412 as well as 1421 and 1422 respectively. A similar data forwarding chain is repeated at steps 1403, 1404, 1413, 1414, 1423 and 1424.

The hop delay $t_h$ is constant and equals the length of a superframe. The total data latency from a subnode to a sink node equals the superframe length times one less the number of required inter-cluster hops, added with the one incomplete length of a superframe it took before the first headnode could start forwarding the data. Previously we have discussed an exemplary superframe length of 260 milliseconds, which is a much more acceptable inter-cluster data latency figure than an average one half of a 10 seconds access cycle. With fast transceivers capable of 1 Mbps transmission rate it is quite possible to shorten the slot length to e.g. one millisecond, which would further decrease data latency by a decade.

As a limitation we must note that the latency reduction scheme described above only works well to one transmission direction only. In the reverse direction it rather maximizes data latency, with a constant inter-cluster delay of almost one whole length of an access cycle. If multi-path routing is supported, each data forwarding node must either select a preferred next-hop entry in the routing table, with reference to which it optimizes its access cycle timing, or select a number of equally preferable next-hop entries and time its access cycle so that forwarding data to any of the corresponding adjacent headnodes will take place after a delay that is as small as possible, taken their different access cycle timetables.

Adjusting access cycle timing is most elegantly handled so that when a headnode wants to change the starting moment of its access cycle, it announces in one cluster beacon a shorter or longer than normal access cycle length, which is only valid for the duration of one (or few) access cycles, after which the timing is correct and the normal access cycle length can be reverted to. The exceptionally early or late beginning of an immediately next access cycle must naturally be also taken into account when inserting values to the "time to next cluster beacon" fields of intervening network beacon signals, if any.

The invention claimed is:

1. A wireless sensor network (100) comprising
   a first headnode (101)
   a first subnode (102) adapted to communicate with the first headnode (101), thus making the first headnode (101) and the first subnode (102) members of a first cluster (103)
   a second headnode (111) and
   a second subnode (112) adapted to communicate with the second headnode (111), thus making the second headnode (111) and the second subnode (112) members of a second cluster;
   characterized in that
   the first headnode (101) is adapted to select a first frequency for use in wireless communications within the first cluster (103)
   the first subnode (102) is adapted to communicate with the first headnode (101) on said first frequency, using a time slotted channel access scheme to allow also other nodes to communicate with the first headnode (101) on said first frequency the second headnode (111) is adapted to find out the first frequency selected by the first headnode (101), and to select a second frequency—different from said first frequency—for use in wireless communications within the second cluster the second subnode (112) is adapted to communicate with the second headnode (111) on said second frequency, using a time slotted channel access scheme to allow also other nodes to communicate with the second headnode (111) on said second frequency, for communicating information from the first cluster (103) to the second cluster, the first headnode (101) is adapted to find out the second frequency selected by the second headnode (111) and to communicate with the second headnode (111) on said second frequency, using the same time slotted channel access scheme as said second subnode (112), and the first headnode (101) and the second headnode (111) are additionally adapted to repeatedly transmit network beacon signals (331, 332) on a third frequency, which is different from said first frequency and said second frequency.

2. A wireless sensor network according to claim 1, characterized in that:

the time slotted channel access schemes applied in each of said first and second clusters comprise in each cluster repetitively occurring access cycles (301), an access cycle (301) comprising a superframe (302) for communications and an idle period (303)

the first head node (101) and the second head node (111) are adapted to transmit active network beacon signals (331)—each active network beacon signal (331) being immediately followed by a superframe (302)—as well as idle network beacon signals (332), each idle network beacon signal (332) being transmitted during said idle period (303) and indicating a remaining idle time before a subsequent superframe (302).

3. A wireless sensor network according to claim 2, characterized in that each of the first headnode (101) and the second headnode (111) is adapted to transmit a cluster beacon signal (321, 322) within each superframe (302), said cluster beacon signal (321, 322) being transmitted on the frequency selected by the headnode for use in wireless communications within the cluster of the headnode.

4. A wireless sensor network according to claim 3, characterized in that each of the first subnode (102) and the second subnode (112) is adapted to make contention based transmissions to the headnode of its cluster within a contention based slot (312) of a superframe (302).

5. A wireless sensor network according to claim 4, characterized in that:

each of the first subnode (102) and the second subnode (112) is adapted to place requests for a reservable slot in superframes (302) to the headnode of its cluster within a contention based slot (312) of a superframe (302) and each of the first headnode (101) and the second headnode (111) is adapted to place requests for a reservable slot in superframes (302) to other headnodes within a contention based slot (312) of a superframe of the time slotted channel access scheme applied in the cluster of such other headnode.

6. A wireless sensor network according to claim 5, characterized in that:

each of the first headnode (101) and the second headnode (111) is adapted to grant a reservable slot (313) to a node that has placed a request for a reservable slot and each of the first headnode (101) and the second headnode (111) is adapted to transmit, within a cluster beacon signal (321, 322) of a superframe, a reservable time slot allocation table (845) indicating granted reservable slots in that superframe (302).

7. A wireless sensor network according to claim 5, characterized in that:

each of the first subnode (102) and the second subnode (112) is adapted to make uplink transmissions to the first headnode (101) and the second headnode (111) respectively in uplink halves (323) of slots (313) of superframes (302) of the respective headnode and each of the first headnode (101) and the second headnode (111) is adapted to make downlink transmissions to subnodes of the headnode's own cluster in downlink halves (324) of slots (313) of the headnode's own superframes (302), and to use said downlink transmissions to acknowledge such preceding uplink transmissions from said subnodes that have included a request for acknowledgement, and each of the first headnode (101) and the second headnode (111) is adapted to make transmissions to another headnode in uplink halves (323) of slots (313) of superframes (302) of said other headnode.

8. A wireless sensor network according to claim 7, characterized in that each of the first headnode (101) and the second headnode (111) is adapted to select a transmission power for a downlink transmission on the basis of an indication of a transmission power used for an uplink transmission which the headnode making the downlink transmission has most recently received from the node to which the headnode is making the downlink transmission, said uplink transmission having included an indication about a transmission power used.

9. A wireless sensor network according to claim 3, characterized in that:

each of the first headnode (101) and the second headnode (111) is adapted to transmit, as said cluster beacon signal (321, 322), a number of successive cluster beacon frames (321, 322) at different power levels and each node receiving cluster beacon signals (321, 322) is adapted to determine, on the basis of the lowest power level beacon frame it was able to receive successfully, a required transmission power level for transmissions to the node that transmitted said cluster beacon signals (321, 322).

10. A wireless sensor network according to claim 9, characterized in that each of the first subnode (102) and the second subnode (112) is adapted to respond to a situation where it was only capable of successfully receiving a highest power level cluster beacon frame from a headnode by performing network scanning in order to find other headnodes.

11. A wireless sensor network according to claim 1, characterized in that:

each of the first headnode (101) and the second headnode (111) is adapted to transmit, as said network beacon signal (331, 332), a number of successive network beacon frames (341, 342) at different power levels and each node receiving network beacon signals is adapted to determine, on the basis of the lowest power level beacon frame it was able to receive successfully, a required transmission power level for transmissions to the node that transmitted said network beacon signals.

12. A wireless sensor network according to claim 1, characterized in that the first headnode (101) and the second headnode (111) are adapted to transmit network beacon signals (331, 332) at a repetition rate that has been determined by minimizing a sum of a mean energy consumption on beacon transmissions and mean energy consumption on network scanning performed to receive beacon transmissions.

13. A wireless sensor network according to claim 12, characterized in that the first headnode (101) and the second headnode (111) are adapted to transmit network beacon signals at a repetition rate $$f_b^* = \sqrt{\frac{P_{rx}}{E_b}\left(\frac{1}{T_{s(h)}} + \frac{n_s}{T_{s(s)}}\right)},$$

where
$P_{rx}$=power consumption of a node in receiving mode,
$E_b$=sum of energy used to transmit a transmission frame at a first transmission power level and energy used to transmit a frame of data at a second transmission power level, lower than said first transmission power level,
$T_{s(h)}$=network scanning interval for headnodes
$T_{s(s)}$=network scanning interval for subnodes and
$n_s$=number of subnodes per each headnode.

14. A wireless sensor network according to claim 1, characterized in that:
each of said first headnode (101) and second headnode (111) is adapted to transmit a full time stamp (843) indicating absolute time in each network beacon signal and a short time stamp (847) indicating a number of least significant bits of absolute time in cluster beacon signals transmitted on the cluster frequency of the headnode,
each node of the wireless sensor network is adapted to read time stamps from received beacon signals and to adjust an internal clock of the node to match a time reference indicated in said time stamps.

15. A wireless sensor network according to claim 14, characterized in that each of said first headnode (101) and second headnode (11) is adapted to transmit a time accuracy indicator (844, 848) together with a time stamp, said time stamp accuracy indicating at least one of number of hops between nodes from a reference time source and time since the node transmitting said time stamp has received a time reference.

16. A wireless sensor network according to claim 1, characterized in that
each of the first (101) and second (111) headnode is adapted to announce, in a transmitted beacon signal, a current load situation (837) in their clusters, and
a node device of said wireless sensor network is adapted to associate as a subnode to one of the clusters of the first (101) or second (111) headnode, or establish itself as a headnode of a new cluster, depending on how loaded the first (101) and second (111) headnode announced their clusters to be.

17. A wireless sensor network according to claim 1, characterized in that at least one of the first (101) and second (111) headnodes is a sink node (104) adapted to collect information from other nodes in the wireless sensor network and to act as a gateway to at least one of another system and another network.

18. A wireless sensor network according to claim 1, characterized in that as node devices (101, 102, 104, 111, 112) it comprises devices adapted to selectively act as either headnodes or subnodes, and devices adapted to act as subnodes only, said device that are adapted to act as subnodes only not being capable of routing or data aggregation.

19. A wireless sensor network according to claim 1, characterized in that as node devices (101, 102, 104, 111, 112) it comprises exclusively devices adapted to selectively act as either headnodes or subnodes.

20. A node device (101, 102, 104, 111, 112, 1101) for a wireless sensor network, comprising:
a wireless transceiver (1151) adapted to exchange information with other node devices on a communications frequency according to a time slotted channel access scheme, and
a controller unit (1141) adapted to control the wireless transceiver (1151), characterized in that the controller unit (1141) is adapted to selectively tune the wireless transceiver (1151) to a first frequency for receiving cluster beacon signals (321, 322) from a cluster headnode and to a second frequency for receiving network beacon signals (331, 332), and the controller unit (1141) is additionally adapted to detect, which parts of a multipart beacon signal (321, 322, 331, 332) were successfully received, and to use said detection for deriving an estimate of a distance between the node device and the device that transmitted said beacon signal.

21. A node device according to claim 20, characterized in that the controller unit (1141) is additionally adapted to select a transmission power level for use in transmissions made by the node device on the basis of which parts of a multipart beacon signal were successfully received.

22. A node device according to claim 20, characterized in that it comprises:
a communications subsystem (1105)
a computing subsystem (1104)
a sensing subsystem (1103) and
a power subsystem (1102);
of which said sensing subsystem (1103) comprises a sensor (1131) and an analog to digital converter (1132), said computing subsystem (1104) comprises a microcontroller unit (1141) and a nonvolatile memory (1142), said communications subsystem (1105) comprises the wireless transceiver (1151) and an antenna (1152), and said power subsystem (1102) comprises an energy source (1121), a regulator (1122) and a rechargeable energy storage (1123).

23. A node device according to claim 22, characterized in that said energy source (1121) is an energy scavenging unit and said rechargeable energy storage (1123) is a supercapacitor.

24. A node device according to claim 22, characterized in that said analog to digital converter (1132) is internal to said microcontroller unit (1141), which additionally comprises parts adapted to execute communications protocols, said parts belonging to said communications subsystem (1105).

25. A node device according to claim 20, characterized in that for performing at least one of cluster association and data forwarding, the node device is adapted to perform cluster scanning, comprising tuning the wireless transceiver to a third frequency, used as a network signaling frequency, and receiving at least one network beacon signal (331, 332) transmitted by a headnode (101, 111) of a cluster (103, 113) in the wireless sensor network.

26. A node device according to claim 25, characterized in that when operating as a headnode, the node device is adapted to keep the wireless transceiver tuned to said network signaling frequency for a maximum duration of a network beacon interval (333) in order to receive a number of network beacon signals (331, 332) from a number of adjacent headnodes.

27. A node device according to claim 25, characterized in that the node device is adapted to respond to a situation where it can only successfully receive a first beacon frame transmitted at a first transmission power level and not a second beacon frame transmitted at a second, lower transmission power level, by commencing search for other headnodes than the one from which said second beacon frame could not be successfully received.

28. A node device according to claim 27, characterized in that the node device is adapted to continue said search for other headnodes for the duration of a network beacon interval (333) and, in case the node device was not able to successfully receive beacon frames from such other headnodes during said network beacon interval, to go into sleep mode for an interval of time and thereafter commence a new search for other headnodes.

29. A node device according to claim 25, characterized in that the node device is adapted to respond to a situation where it can only successfully receive a first beacon frame transmitted at a first transmission power level and not a second beacon frame transmitted at a second, lower transmission power level by selecting a higher power level for making its own wireless transmissions than in a situation where it can successfully receive both said first beacon frame transmitted at said first transmission power level and said second beacon frame transmitted at said second, lower transmission power level.

30. A node device according to claim 25, characterized in that the node device is adapted to alternatively associate as a subnode to an existing cluster, or establish itself as a headnode of a new cluster, depending on how loaded existing clusters appeared to be judging by loading announcements the node device has received from headnode of said existing clusters.

31. A node device according to claim 20, characterized in that the node device is adapted to attempt changing from a subnode status to a headnode status in the wireless sensor network at the fulfillment of predefined criteria, and, as a part of said attempting, to wait for the duration of a delay before transmitting a network beacon signal, the length of the delay being inversely proportional to an amount of energy that is available for the operation of the node device.

32. A node device according to claim 20, characterized in that the node device is adapted to attempt changing from a subnode status to a headnode status in the wireless sensor network at the fulfillment of predefined criteria, and, as a part of said attempting, to wait for the duration of a delay before transmitting a network beacon signal, the length of the delay being directly proportional to at least one of a number of existing headnodes, network beacon transmissions of which the node device is capable of receiving, and known degree of mobility of the node device.

33. A node device according to claim 20, characterized in that the node device is adapted to maintain a routing table entry indicating a next-hop node on a path towards a sink node.

34. A node device according to claim 33, characterized in that the node device is adapted to act as a headnode in the wireless sensor network, said acting as a headnode comprising setting the timing of an access cycle that consists of a communications superframe and an idle period, and—in order to minimize data latency on said path towards a sink node—the node device is additionally adapted to set the timing of said access cycle so that said communications superframe ends immediately before a communications superframe belonging to an access cycle of said next-hop node.

35. A method for arranging communications in a wireless sensor network, characterized in that it comprises:
  selecting a first frequency for use in wireless communications between a headnode and subnodes of a first cluster (103)
  communicating information between the nodes of said first cluster (103) on said first frequency, using a time slotted channel access scheme
  informing a headnode of a second cluster (113) about the first frequency selected for the first cluster (103), and selecting a second frequency—different from said first frequency—for use in wireless communications within said second cluster (113)
  communicating information between the nodes of said second cluster (113) on said second frequency, using a time slotted channel access scheme and
  informing the headnode of the first cluster (103) about the second frequency selected for the second cluster (113) and communicating information from the headnode of said first cluster (103) to the headnode of said second cluster (113) on said second frequency, using the same time slotted channel access scheme as other nodes in said second cluster (113).

36. A method according to claim 35, characterized in that it comprises:
  arranging wireless transmissions in each of said first and second clusters in repetitively occurring access cycles (301), an access cycle (301) comprising a superframe (302) for communications and an idle period (303)
  transmitting, by the headnodes of the first and second clusters, active network beacon signals (331)—each active network beacon signal being immediately followed by a superframe (302)—as well as idle network beacon signals (332), each idle network beacon signal (332) being transmitted during said idle period (303) and indicating a remaining idle time before a subsequent superframe (302).

37. A method according to claim 36, characterized in that it comprises transmitting, by the headnodes of the first and second clusters, a cluster beacon signal (321, 322) within each superframe (302), said cluster beacon signal (321, 322) being transmitted on the frequency selected by the headnode for use in wireless communications within the cluster of the headnode.

38. A method according to claim 36, characterized in that it comprises making contention based transmissions to the headnodes of clusters within contention based slots (312) of superframes (302).

39. A method according to claim 38, characterized in that it comprises:
  placing, by subnodes, requests for reservable slots in superframes (302) to the headnodes of their clusters within contention based slots (312) of superframes and
  placing, by headnodes, requests for reservable slots in superframes (302) to other headnodes within contention based slots (312) of superframes of the time slotted channel access scheme applied in the clusters of such other headnodes.

40. A method according to claim 39, characterized in that it comprises:
  granting, by headnodes, reservable slots (313) to nodes that have placed a request for a reservable slot and
  transmitting, by headnodes and within cluster beacon signals (321, 322) of superframes (302), a reservable time slot allocation table (845) indicating granted reservable slots in that superframe (302).

41. A method according to claim 40, characterized in that said granting reservable slots involves giving priority to other headnodes over subnodes.

42. A method according to claim 36, characterized in that it comprises:
- transmitting as cluster beacon signals (321, 322) a number of successive cluster beacon frames (321, 322) at different power levels and
- in each node receiving cluster beacon signals (321, 322) determining, on the basis of the lowest power level beacon frame received successfully, a required transmission power level for transmissions to the node that transmitted said cluster beacon signals.

43. A method according to claim 42, characterized in that it comprises performing network scanning in order to find other headnodes in a situation where a subnode was only capable of successfully receiving a highest power level cluster beacon frame (321) from a headnode.

44. A method according to claim 35, characterized in that it comprises:
- transmitting, as network beacon signals (331, 332), a number of successive network beacon frames (331, 332) at different power levels and
- in each node receiving network beacon signals determining, on the basis of the lowest power level beacon frame received successfully, a required transmission power level for transmissions to the node that transmitted said network beacon signals.

45. A method according to claim 35, characterized in that it comprise transmitting network beacon signals (331, 332) at a repetition rate that has been determined by minimizing a sum of a mean energy consumption on beacon transmissions and mean energy consumption on network scanning performed to receive beacon transmissions.

46. A method according to claim 45, characterized in that it comprises transmitting network beacon signals (331, 332) at a repetition rate $$f_b^* = \sqrt{\frac{P_{rx}}{E_b}\left(\frac{1}{T_{s(h)}} + \frac{n_s}{T_{s(s)}}\right)},$$

where
- $P_{rx}$ = power consumption of a node in receiving mode,
- $E_b$ = sum of energy used to transmit a frame of data at a first transmission power level and energy used to transmit a frame of data at a second transmission power level, lower than said first transmission power level,
- $T_{s(h)}$ = network scanning interval for headnodes
- $T_{s(s)}$ = network scanning interval for subnodes and
- $n_s$ = number of subnodes per each headnode.

47. A method according to claim 35, characterized in that it comprises:
- announcing, in a transmitted beacon signal, a current load situation (837) in the cluster of the headnode transmitting the beacon signal, and
- deciding to associate a node device as a subnode to one of existing clusters, or to establish said node device as a headnode of a new cluster, depending on how loaded the existing clusters were announced to be.

48. A method according to claim 35, characterized in that it comprises making the ratio of active time to the length of an access cycle larger in headnodes than in subnodes in order to reduce overall energy consumption of the wireless sensor network.

49. A method according to claim 35, characterized in that it comprises distributing a time reference from a reference time source through the nodes of the wireless sensor network.

* * * * *